Feb. 8, 1966 L. E. VEO ETAL 3,233,973
APPARATUS AND METHOD FOR PROCESSING MATERIAL
Filed March 29, 1962 15 Sheets-Sheet 1

INVENTORS
LAWRENCE E. VEO
DAVID E. STEVENS, Jr.
EDWARD T. MITMAN
ALBERT H. FRENCH
CURTIS A. ZIMMERMAN
CARL H. BAST
BY

INVENTORS
LAWRENCE E. VEO
DAVID E. STEVENS, Jr.
EDWARD T. MITMAN
ALBERT H. FRENCH
CURTIS A. ZIMMERMAN
CARL H. BAST

INVENTORS
LAWRENCE E. VEO
DAVID E. STEVENS, Jr.
EDWARD T. MITMAN
ALBERT H. FRENCH
CURTIS A. ZIMMERMAN
CARL H. BAST

Feb. 8, 1966 L. E. VEO ETAL 3,233,973
APPARATUS AND METHOD FOR PROCESSING MATERIAL
Filed March 29, 1962 15 Sheets-Sheet 5
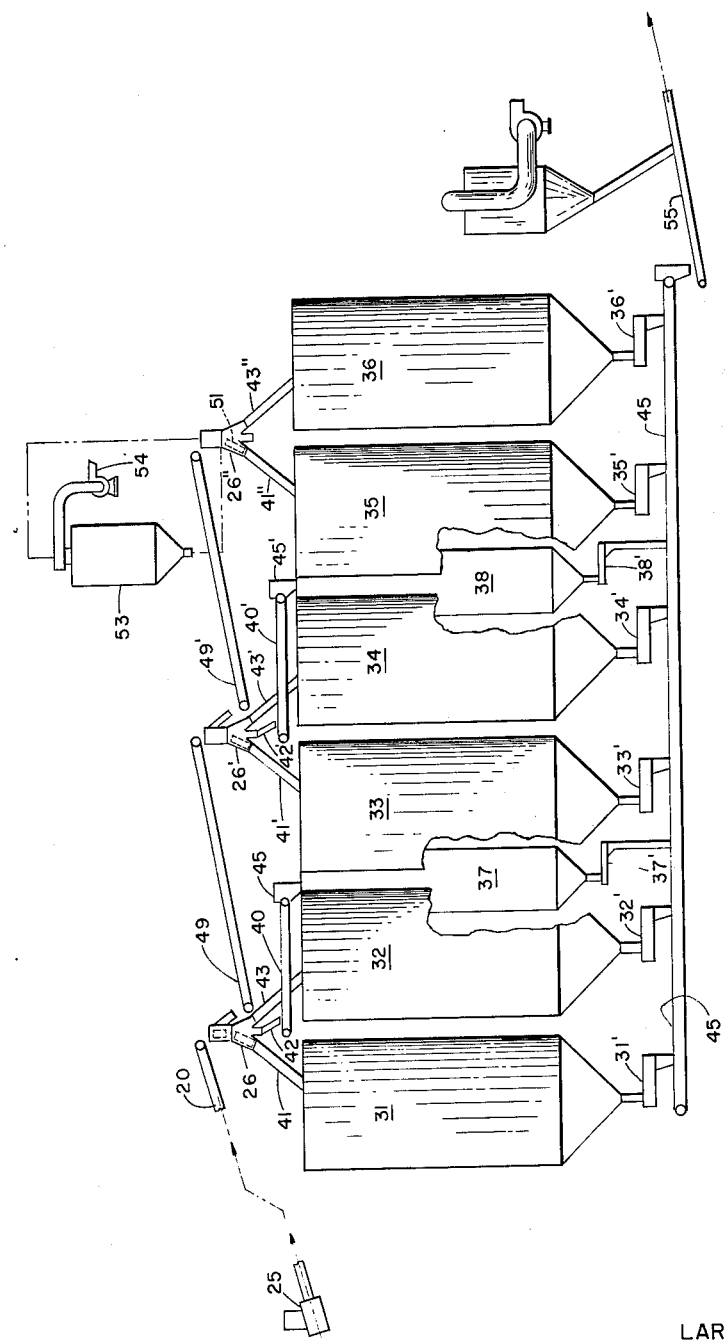
INVENTORS
LARWENCE E. VEO
DAVID E. STEVENS, Jr.
BY EDWARD T. MITMAN
ALBERT H. FRENCH
CURTIS A. ZIMMERMAN
CARL H. BAST Feb. 8, 1966 L. E. VEO ETAL 3,233,973
APPARATUS AND METHOD FOR PROCESSING MATERIAL
Filed March 29, 1962 15 Sheets-Sheet 6

INVENTORS
LAWRENCE E. VEO
DAVID E. STEVENS, Jr.
BY EDWARD T. MITMAN
ALBERT H. FRENCH
CURTIS A. ZIMMERMAN
CARL H. BAST

Feb. 8, 1966 L. E. VEO ETAL 3,233,973
APPARATUS AND METHOD FOR PROCESSING MATERIAL
Filed March 29, 1962 15 Sheets-Sheet 7

INVENTORS
LAWRENCE E. VEO
DAVID E. STEVENS, Jr.
BY EDWARD T. MITMAN
ALBERT H. FRENCH
CURTIS A. ZIMMERMAN
CARL H. BAST

Feb. 8, 1966 L. E. VEO ETAL 3,233,973
APPARATUS AND METHOD FOR PROCESSING MATERIAL
Filed March 29, 1962 15 Sheets-Sheet 8

INVENTORS
LAWRENCE E. VEO
DAVID E. STEVENS, Jr.
BY EDWARD T. MITMAN
ALBERT H. FRENCH
CURTIS A. ZIMMERMAN
CARL H. BAST

INVENTORS
LAWRENCE E. VEO
DAVID E. STEVENS, Jr.
EDWARD T. MITMAN
ALBERT H. FRENCH
CURTIS A. ZIMMERMAN
CARL H. BAST

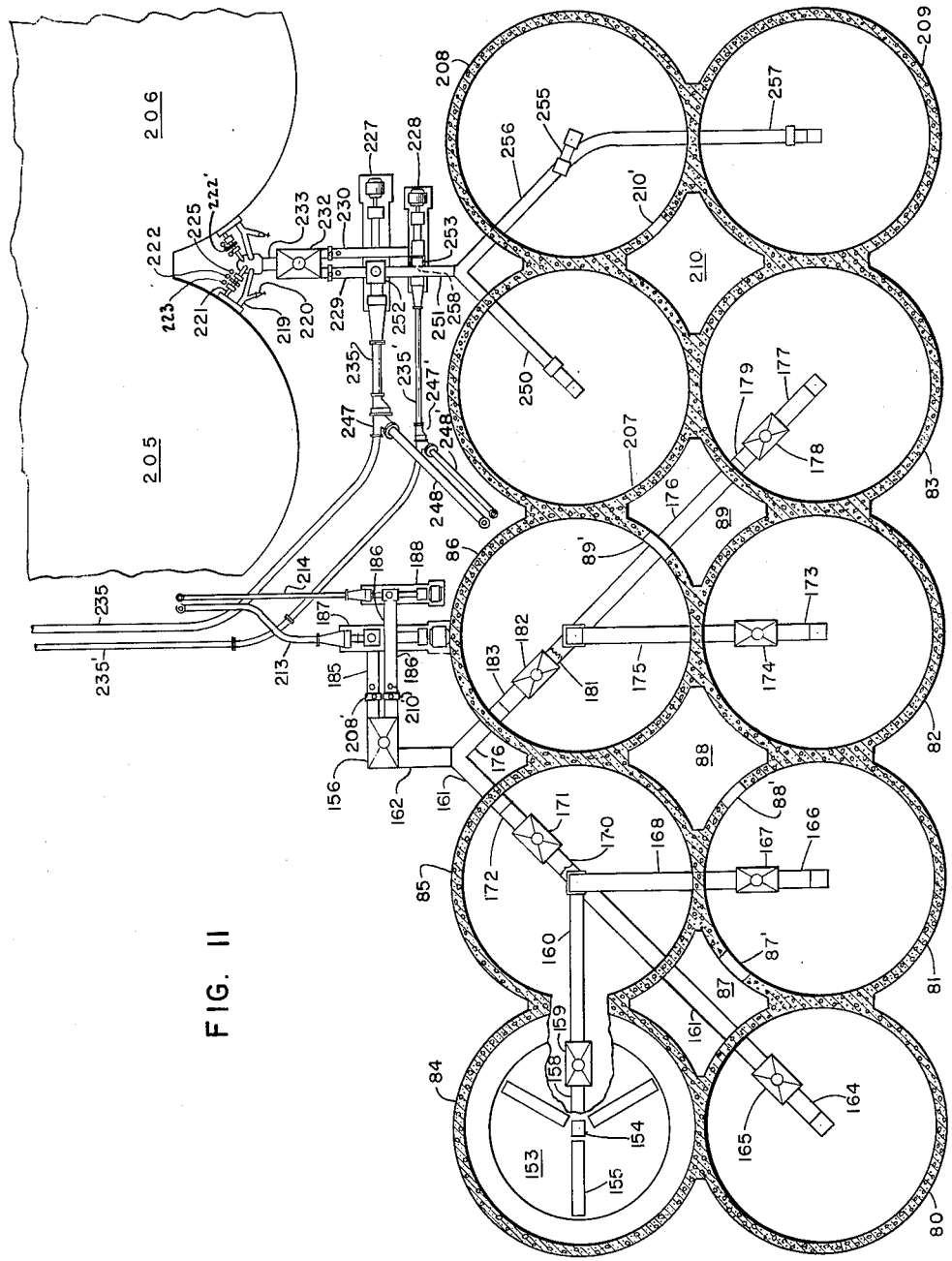

INVENTORS
LAWRENCE E. VEO
DAVID E. STEVENS, Jr.
EDWARD T. MITMAN
ALBERT H. FRENCH
CURTIS A. ZIMMERMAN
CARL H. BAST

INVENTORS
LAWRENCE E. VEO.
DAVID E. STEVENS, Jr.
EDWARD T. MITMAN
ALBERT H. FRENCH
CURTIS. A ZIMMERMAN
CARL H. BAST

Feb. 8, 1966 L. E. VEO ETAL 3,233,973
APPARATUS AND METHOD FOR PROCESSING MATERIAL
Filed March 29, 1962 15 Sheets-Sheet 14

INVENTORS
LAWRENCE E. VEO
DAVID E. STEVENS, Jr.
BY EDWARD T. MITMAN
ALBERT H. FRENCH
CURTIS A. ZIMMERMAN
CARL H. BAST

Feb. 8, 1966 L. E. VEO ETAL 3,233,973
APPARATUS AND METHOD FOR PROCESSING MATERIAL
Filed March 29, 1962 15 Sheets-Sheet 15
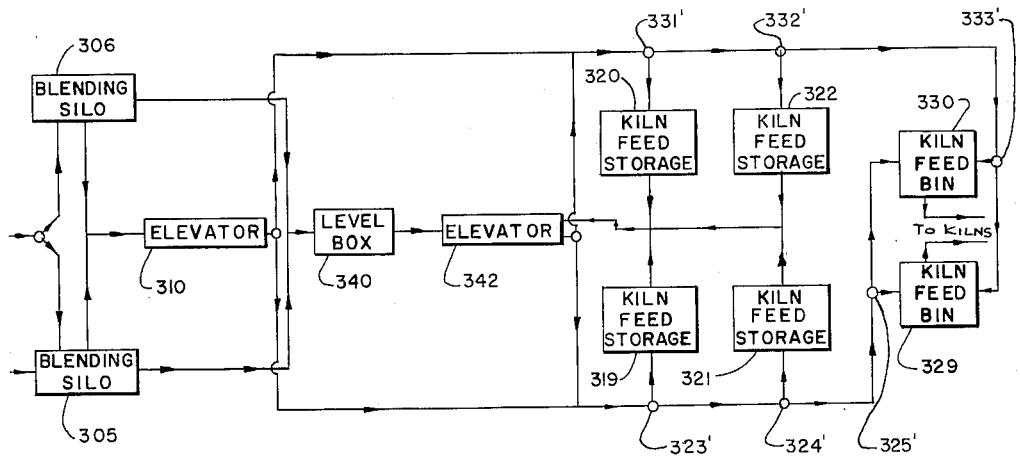
FIG. 16
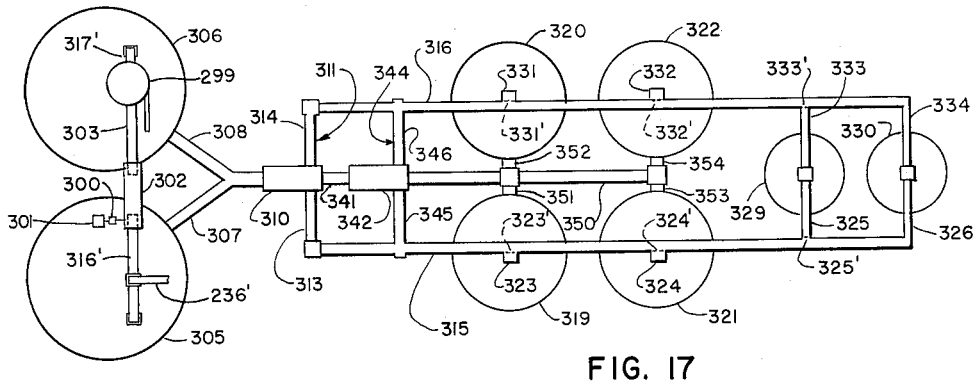
FIG. 17
FIG. 18
*INVENTORS*
LAWRENCE E. VEO
DAVID E. STEVENS, Jr.
EDWARD T. MITMAN
ALBERT H. FRENCH
CURTIS A. ZIMMERMAN
CARL H. BAST
BY 3,233,973
APPARATUS AND METHOD FOR PROCESSING
MATERIAL
Lawrence E. Veo and David E. Stevens, Jr., Emmaus, Edward T. Mitman and Albert H. French, Schnecksville, Curtis A. Zimmerman, Fullerton, and Carl H. Bast, Catasauqua, Pa., assignors to Fuller Company, a corporation of Delaware
Filed Mar. 29, 1962, Ser. No. 183,464
13 Claims. (Cl. 23—230)

The present invention relates to an improved method of processing material and apparatus for carrying out the process and is particularly concerned with apparatus for the automatic preparation and control of material used in the production of Portland cement.

Previous attempts have been made toward automating the process of manufacturing Portland cement. However, most of these efforts have been concerned with automating the burning process in the kiln. Such attempts have been for the most part unsuccessful, in particular because of variations in the raw feed introduced into the kiln for burning.

Portland cement is manufactured from a combination of raw materials, the main ingredient being calcium oxide whose principal source is calcium carbonate or limestone. The limestone is calcined to produce calcium oxide. Other important ingredients in the manufacture of Portland cement are silica, frequently with sand being the source, and small quantities of alumina and iron.

The raw materials are crushed, combined and ground in the proper proportions, and blended prior to burning in the kiln. Extremely high temperatures are realized in the kiln, generally between 2500° F. and 2800° F., in the formation of Portland cement which consists primarily of various calcium/silica compounds.

In the present day cement plants, a chemist analyzes the raw materials in various sections of the quarry, and the shovel operation in the quarry attempts to provide the crushing and mill systems with material having the desired chemical makeup. Samples of the material are taken and analyzed throughout the preparation of the raw material. However, such samples are taken at infrequent intervals due to the time-consuming laboratory methods of analysis. In view of this, and since the various kinds of raw material are combined prior to raw mill grinding, a considerable time lag exists between the introduction of the raw material in a combined state, and the determination of the composition of such material as a result of the analysis.

The greater the time lag between the introduction of the material into the system, in a combined state, and the analysis of the composition of this material, the more difficult it is to apply the proper correction to achieve a raw mix having the composition required for burning into quality-controlled cement. Consequently, due to this considerable time lag, and due to the infrequency of the number of times the material is analyzed, it frequently happens that the material burned in present day kiln practice is deficient in one or more of the necessary ingredients, thus resulting in a lower quality finished product. Sometimes the finished cement will require the addition of special make-up cement supplying any deficient ingredient required for a suitable finished product. While this can be done in many cases, such procedures are quite costly.

In addition to affecting the quality of the finished product, the use of raw materials with varying compositions has adverse effects on the kiln operation.

Cement kiln burning processes are very delicate and can easily be upset. The less adjustments required in the process, the easier it is to properly burn the raw materials. In addition, the life of the kiln is so affected that providing the kiln with raw material of uniform composition reduces maintenance costs.

The present invention incorporates a novel method and novel apparatus for automatically controlling the preparation of raw materials used in the manufacture of cement to obviate the deficiencies mentioned above, as well as to provide other advantages as will hereinafter appear.

In accordance with the present invention, a raw mix of uniform composition is provided, the burning of which can be more readily and accurately controlled.

The present invention effects a considerable reduction of the time lag between the introduction of the combined raw materials into the system and the analysis of such materials, and further provides means for taking and analyzing substantially continuous samples of the raw material.

Applicants herein provide for the automatic proportioning of the various components making up the raw mix, to effect a raw mix having a composition within predetermined limits.

The present invention enables more efficient use of the grinding mechanism or circuits to reduce operational costs and provide a raw material of a more uniform particle size than can be obtained in present day methods.

The present invention provides a versatile and improved system for feeding material from blending or storage silos to any or all of the kilns.

In general, the preferred form of the present invention contemplates a novel method and apparatus for separately grinding different kinds of cement raw material to a fine particle size for burning into cement clinker, substantially continuously sorting the finely-ground material according to predetermined chemical classifications, and combining material from said classifications in proportions to provide a combined material having a composition within predetermined chemical limits.

Preferably, means also are provided for substantially continuously analyzing the ground material prior to the sorting, and also for substantially continuously analyzing the material combined from the classifications to determine deviations in the composition outside a predetermined range, and upon the determination of any such deviations, combining material from the respective classifications in adjusted proportions to correct for such deviations, and to provide a combined material having a composition within the predetermined chemical limits.

As a further refinement, the combined material is blended, preferably in a silo, to provide a homogeneous raw mix for burning into quality cement clinker. In addition, by blending in a large volume, any deviations occurring in the composition of the material fed to the silo during a short interval of time will be distributed over a large volume of material to substantially reduce the effect of such deviations on the composition of the combined material.

The present invention is more particularly described in connection with the accompanying drawings, in which:

FIG. 3 is a side view of the rock storage silos and conveying mechanism for filling and discharging the silos;

FIG. 11 is a horizontal sectional view through the ground storage silos with all but one of the silo bottoms completely omitted to show the conveying means for feeding the material from the ground storage silos to the blending silos;

FIG. 16 is a schematic block diagram of the material flow in a modified blending system;

FIG. 17 is a plan view of the modified blending system of FIG. 16, including overflow blending silos, kiln feed storage silos, kiln feed bins and related conveying equipment, and FIG. 18 is a side view of the equipment shown in FIG. 17.

Figure 1A:
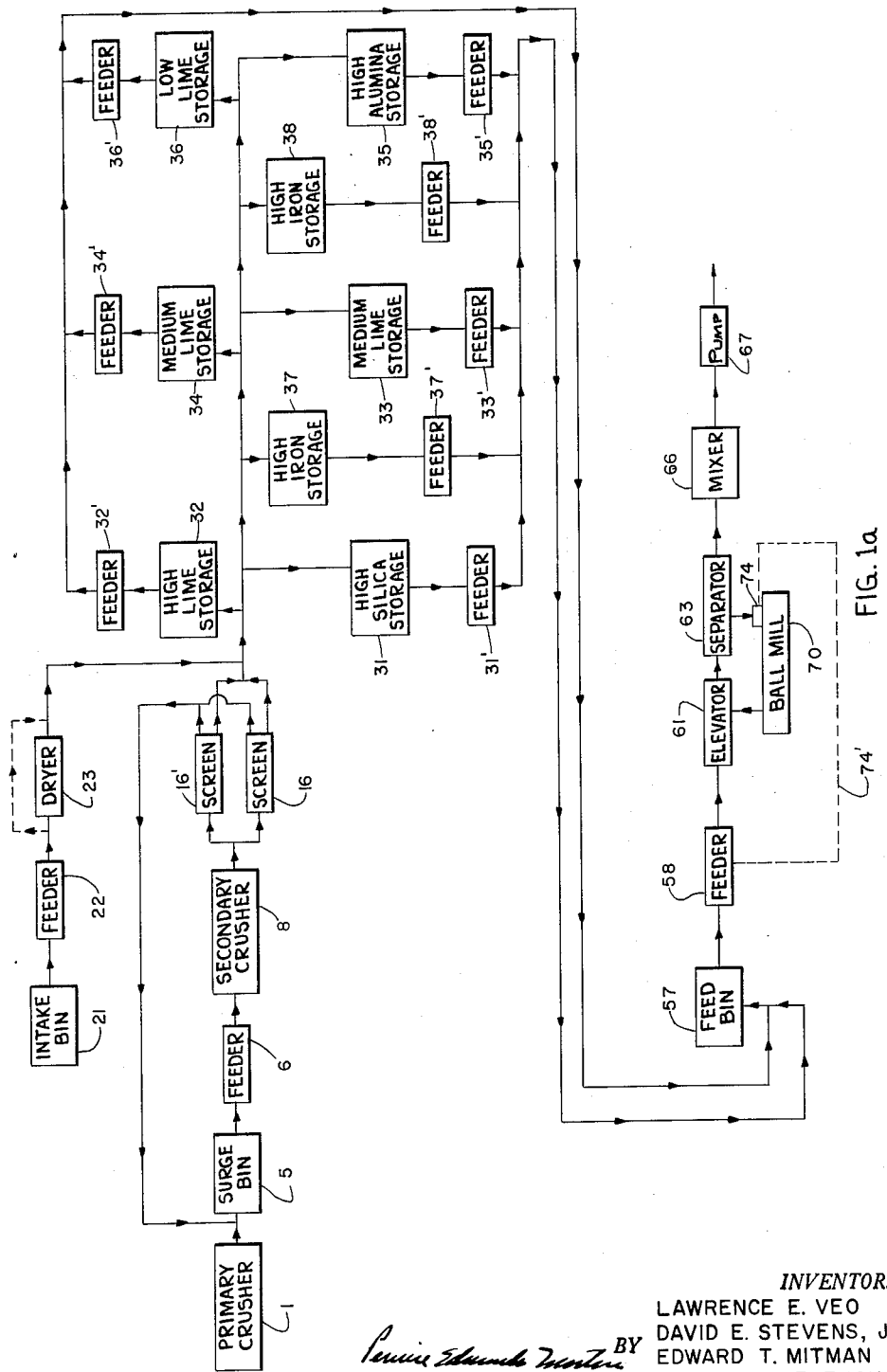
FIG. 1a, 1b and 1c illustrate a schematic block diagram of the flow of the material from the primary crusher to the kilns.

In carrying out the present invention, the material in the quarry is analyzed beforehand and preferably a single grade of material is quarried at a given time. For example, a material containing high lime might be quarried in one shift with material having a composition within a different chemical range being quarried on a subsequent shift. Materials so quarried are fed to a gyratory or primary crusher of the type used in present-day cement manufacture, and is shown at 1 in FIGS. 1a and 2. The crusher 1 may be of the type disclosed in the United States patent to Beyhl No. 2,977,057. From the crusher 1 the material is fed via a feeder 2 to a belt conveyor 4. The particle size of the material discharged from the gyratory crusher 1 to the conveyor belt 4 is, for example, between about five and five and one-half inches. The belt conveyor 4 has an upper end overlying a surge bin 5. A vibrating-type feeder 6 feeds material from the surge bin to an impactor or secondary crusher 8 which further reduces the particle size. The impactor 8 may be similar to the device disclosed in Kessler patent U.S. No. 2,585,943.

Material passing through the impactor or secondary crusher 8 is discharged to a feed hopper 9 and onto a belt conveyor 10. The upper end of belt conveyor 10 overlies a hopper 12. Hopper 12 is connected with screen assemblies 15 and 15′ by spouts 14 and 14′.

The screen assemblies 15 and 15′ contain vibrating screens 16 and 16′ overlying the upper ends of discharge spouts 18 and 18′, respectively, which receives the fines from the screen assemblies. The lower ends of spouts 18 and 18′ overlie and discharge onto an inclined belt conveyor 20 which conveys the fine product to rock storage means. The lower ends of the vibrating screens 16 and 16′ are adjacent the receiving ends of discharge spouts 19 and 19′, respectively, which receive the rejects from the screen assemblies. The lower portions of discharge spouts 19 and 19′ overlie and discharge onto belt conveyor 4 which returns the screened rejects to the surge bin 5 located above secondary crusher 8. The screened rejects delivered to the belt conveyor 4 are recirculated through the surge bin 5, secondary crusher 8 and screen assemblies 15 and 15′ until they are reduced to the required fineness of about minus one-half inch.

A portion of the material falling into hopper 12 from belt conveyor 10 discharges through spout 14 into the screen assembly 15 while the remainder of the material falling into hopper 12 goes through spout 14′ to screen assembly 15′. The vibrating screens 16 and 16′ are sized to allow passage of material minus one-half inch or less in size, which is the desired particle size for storage in the rock storage area.

An outside material hopper 21 is located intermediate the crushing systems and the rock storage means. Material from hopper 21 is delivered by feed belt 22, drier 23, and feed chute or conveyor 24, onto belt conveyor 20. Hopper 21 and belt conveyor 22 are used to introduce material to the rock storage silos which need not be ground by the primary and secondary crushers. For example, sand or iron ore may be introduced into hopper 21 to add respectively silica or iron if these materials are not available in sufficient quantities in the quarry.

Built into the upper end of belt conveyor 20 is a weightometer 25 which continuously weighs the material passing from the screens 16, 16′ of the primary and secondary crushing systems to the rock storage means. A cumulative tabulation of the incoming material may be maintained, if desired. Material from the primary and secondary crushing systems is fed into rock storage means wherein the varying kinds of quarried material are separately stored. The rock storage means may comprise a plurality of silos 31–38, as illustrated in FIG. 3, or a craneway storage system.

Due to better dust control, and more reliable filling and discharging, silos generally are preferred over craneway storage. Hence, the rock storage means is illustrated as a plurality of silos 31 through 38 in the drawing. However, in situations where dust control is not an important factor, craneway storage may be desirable due to its lower cost. The present invention is applicable to both silo and craneway storage.

Figure 2:
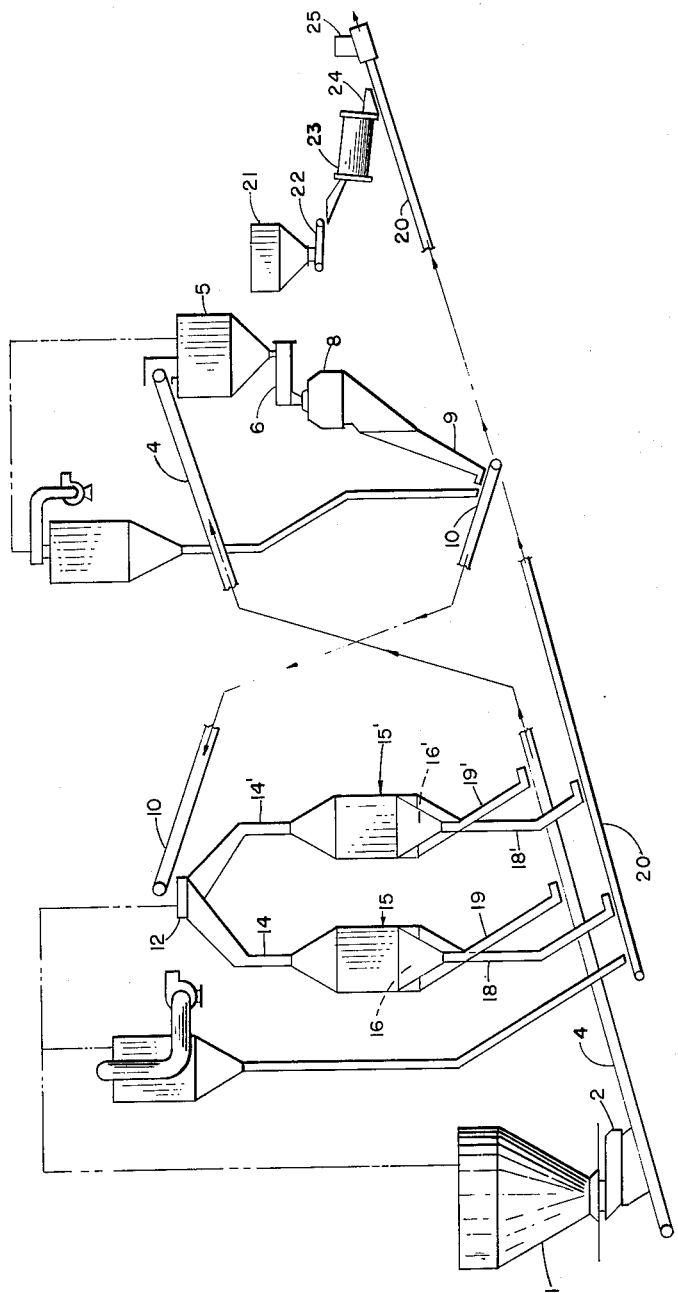
FIG. 2 is a side view, partially broken away, of the primary and secondary crushing systems.

As illustrated in FIG. 1a, rock storage silos 31 through 38 respectively contain material having high silica, high lime, medium lime, medium lime, high alumina, low lime, high iron and high iron contents.

Located above the rock storage silos 31–38, FIG. 3, are diverting units 26, 26′ and 26″. Diverting unit 26 underlies the upper end of belt conveyor 20 to receive material from the screens 16, 16′ coming off the belt conveyor. The diverting unit 26 has three spaced openings in its lower end which are connected to rock storage silo 31, belt conveyor 40, and rock storage silo 32 by means of feed spouts 41, 42 and 43, respectively. Belt conveyor 40 extends into feed box 45 above storage silo 37.

Figure 4:
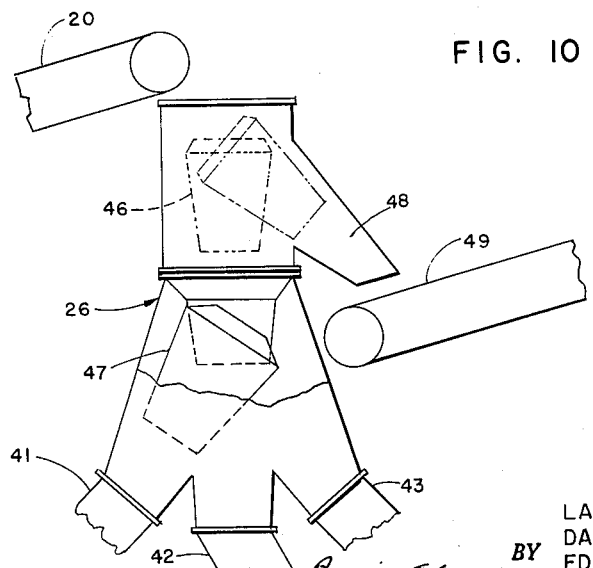
FIG. 4 is an enlarged side view of one of the spout diverter mechanisms illustrated in FIG. 3.

Diverter unit 26 contains upper and lower pivoted diverter spouts 46 and 47, FIG. 4. Material entering the upper end of diverter unit 26 drops into the receiving end of the upper diverter spout 46. Spout 46 can be moved to either of two positions with the discharge end thereof overlying either the receiving end of the lower spout 47 or a fixed spout 48 having an outlet overlying a belt conveyor 49. The lower diverter spout 47 has three positions wherein its discharge end overlies any one of the three openings in the bottom of unit 26 leading to the feed spouts 41, 42 and 43, respectively. Depending upon the position of diverter spouts 46 and 47, the material discharged from belt 20 will be diverted into silo 31, silo 32, silo 37 or onto inclined belt conveyor 49.

Belt conveyor 49 has an upper end overlying diverter unit 26', the latter being constructed similarly to diverter unit 26. Unit 26' has feed spouts 41', 42' and 43' communicating with rock storage silo 33, belt conveyor 49' and rock storage silo 34, respectively. Belt conveyor 40' has a discharge end within feed spout 45' located above silo 38. Unit 26' has two pivoted diverter spouts 46' and 47' similar to the spouts 46 and 47 of diverter unit 26. Depending upon the position of spouts 46' and 47', incoming material from belt conveyor 49 is conveyed to silo 33, silo 34, silo 38 or onto second inclined belt conveyor 49'.

Belt conveyor 49', has an upper end overlying diverter unit 26", which is similar in construction to diverter units 26 and 26'. However, unit 26" contains only two feed spouts 41" and 43" which communicate with rock storage silos 35 and 36, respectively. In addition, unit 26" has only a single pivoted diverter spout 51, which may be swung into one of two positions wherein the discharge end thereof overlies the receiving end of either of feed spouts 41' or 43". Material fed from the diverter unit 26' via belt 49' enters the receiving end of unit 26" and is discharged into either silo 35 or 36 depending upon the position of the diverter spout 51.

Pivoted diverter spouts 46, 47, 46', 47' and 51 preferably are actuated by conventional pneumatic means, including solenoid pilot valves, limit switches and the necessary electrical circuits to properly position the diverter spouts. The positioning of the diverter spouts and movement of the belt conveyors is effected by an operator located near the primary crushing system.

Only one grade of material is quarried at a given time. Based upon the analysis of such material by conventional methods, the operator decides in advance into which of the rock storage silos the material will be stored. For example, if medium limestone is being quarried and the operator desires to store the material in medium limestone silo 34, the operator will effect the following operation: Spout 46 is positioned with its discharge end overlying belt conveyor 49. Diverter spout 46' in diverter unit 26' is positioned with its dicharge end overlying the receiving end of diverter spout 47'. Diverter spout 47' is positioned with its discharge end overlying the inlet to feed spout 43'. Material conveyed on belt conveyor 20 will drop into diverter unit 26, through spouts 46 and 48, onto belt conveyor 49. Belt conveyor 49 conveys the material into diverter unit 26' and the material will be diverted through diverter spouts 46' and 47' through feed spouts 43' into medium limestone silo 34. The operator can effect the positioning of the several spouts and the movement of the conveyor belts so that the material coming from the crushing system may be supplied to any of the rock storage silos 31 to 38.

A dust collector 53 is connected by conventional means to each of the rock storage silos to filter the air and to collect the dust. The collector 53 has a fan 54 for creating a reduced pressure within the collector to induce the flow of dust thereinto. Dust is returned from the dust collector 53 to the low lime silo 36 by suitable piping not shown.

Preferably a single kind of material is discharged from the rock storage silos at a time, with the material being fed through a grinding mechanism or mill circuit to ground-material storage or component silos which respectively store the various predetermined types of material according to chemical compositions.

Figure 5:
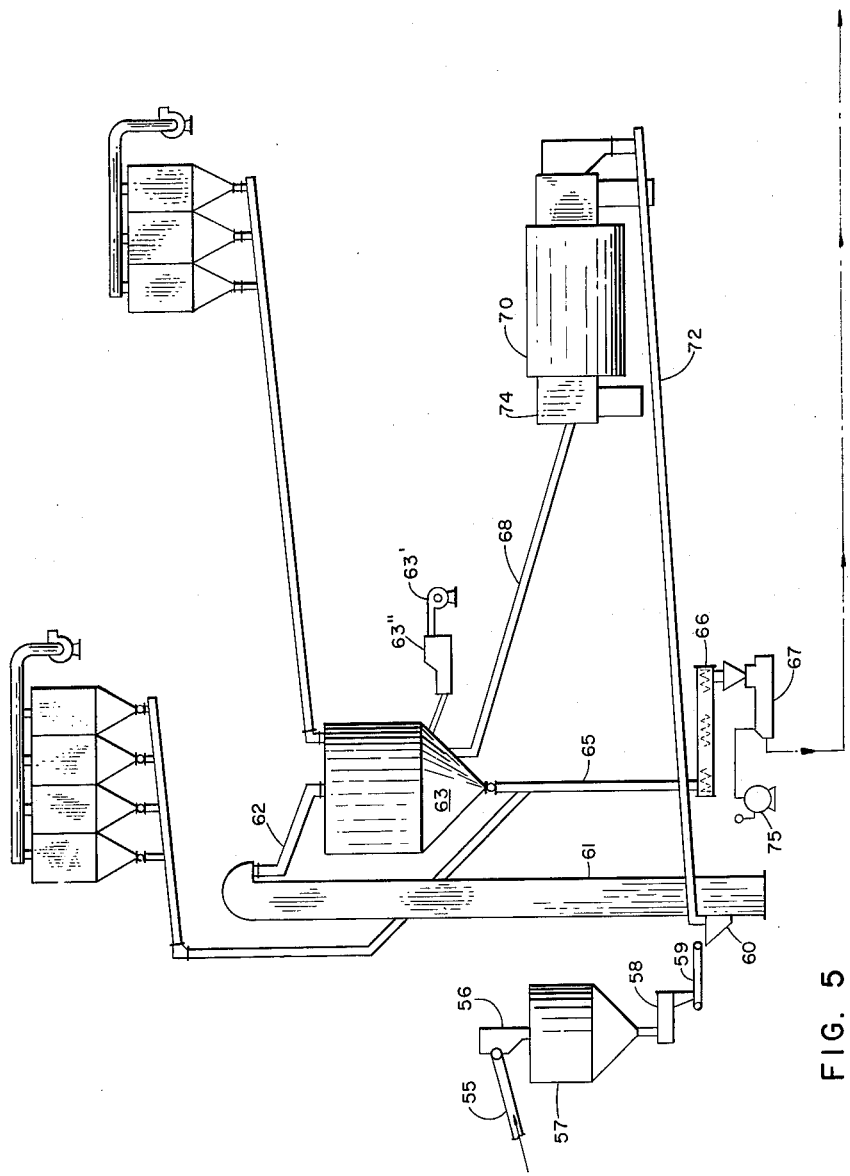
FIG. 5 is a side view of a grinding mill circuit.

Material from the rock storage silos is withdrawn by composition, with preferably one kind of quarried material being discharged at a given time. Each of the rock storage silos 31 through 38 has a vibrating type feeder 31' through 38' which individually feeds onto a belt conveyor 45 having an end portion overlying the lower end of an inclined belt conveyor 55. Belt conveyor 55 has an upper end extending into feed spout 56, FIG. 5, for introducing material into a feed bin 57. Feed bin 57 has conventional high and low level bin signals (not shown) which control the operation of the vibrating feeders 31'-38' to maintain material in the feed bin. When the material in bin 57 is reduced to a predetermined low level, the low level bin signal operates the vibrating feeder under the proper rock storage silo, and material will be fed from that rock storage silo to the feed bin 57 until the material reaches a predetermined high level. At this point the high level bin signal will stop the vibrating feeder and the material discharge from the rock storage silo will be discontinued until the material level in the feed bin again reaches the predetermined low level.

There is no need to modulate the discharge of material from the rock storage silos since feeders 31'-38' need only maintain a supply of material in feed bin 57 within the limits of the high and low bin signals. Hence, feeders 31'-38' are preferably off-on feeders operated at a constant speed.

Feed bin 57 is supplied with a variable rate feeder such as a conventional weigh-feeder 48 for feeding the material onto a conveyor belt 59 which conveys material through an inlet spout 60 of a bucket type elevator 61. Material in the bucket type elevator 61 is fed into a spout 62 which conducts the material into an air classifier or separator 63. Separator 63 may be of the type disclosed in U.S. patent to Sturtevant No. 1,769,721. The fine material separated in separator 63 is discharged through spout 65 into a ribbon-type mixer 66 which discharges the material into the inlet of pump 67. The coarser material leaves the separator through a duct 68 and is introduced into a grinding mill, such as a ball mill 70. After being ground in ball mill 70, the material is reintroduced into the separator 63 by means of fluidized gravity conveying section 72 leading to the elevator 61. The material is recirculated through the ball mill and separator with material of the desired fineness being separated out and introduced into the mixer 66. If needed to reduce the moisture content of the material in the separator, air may be blown by blower 63' through heater 63" into separator 63. Dust is confined to the system by conventional dust collectors.

It is highly desirable that a single kind of material be withdrawn from the rock storage silos 31-38 at a given time, so that the ball mill circuit following the rock storage silos will be grinding one kind of material at a time. With the material being of more or less uniform composition, more efficient operation of the grinding mill is effected. Under present-day operations, the combining of the raw materials is done prior to grinding. Since the various raw materials in the cement raw feed have varying physical properties, it is difficult to have the finished raw product of uniform particle size. The soft materials tend to be ground too finely if the harder materials are ground to the desired size. However, if a single kind of material is ground at one time, the material can be ground to the desired fineness readily and with optimum efficiency of the grinding mechanism or mill circuits. In the present invention, the ball mill, elevator separator circuit grinds one kind of material during one shift and possibly material of a different composition on the next shift. The only criterion for a raw mill feed is that its composition be in a range that it can be used as a component for the kiln feed mix.

It is highly desirable that the ball mill 70 be run at optimum capacity, that is, at maximum capacity in which the material entering the mixer from the separator 63 is of a fineness of grind so that the ultimate cement will be of the required quality. To enable this optimum capacity to be reached, the ball mill 70 is a component in a closed grinding circuit. A conventional sensing device 74 is located adjacent the inlet of the ball mill 70. Device 74 senses the bulk density and determines the quantitative rate of flow or the mass flow of the material entering the ball mill 70 from the separator 63. When a variation in the mass flow is detected by the sensing device, a signal is sent back through line 74′, FIG. 1a, to the feeder 58 to correspondingly vary its speed. Consequently, the feeding of the material from the feed bin 57 to the elevator is altered accordingly, depending upon the mass flow of material in the duct leading to the mill 70. Unlike the vibrating feeders 31′–38′, feeder 58 is highly sensitive and modulates the discharge of material from the feed bin 57 into the elevator 61. While a bulk density type sensing means is illustrated, there are other types of sensing means which can be used. For example, a means for sensing the load in the separator could send signals to the feeder 58. Similarly, a sonic sensing device in the ball mill could be used. The important consideration is that the sensing device be properly calibrated so that the feed is regulated to result in optimum operating condition of the ball mill. U.S. Patents No. 1,413,934, No. 2,491,466 and No. 3,011,726 illustrate various sensing devices which may be used.

A pump 67 receives material from the mixer 66 and entrains the material in an air stream supplied by a compressor 75. The air carries the material into an alleviator 76, FIGS. 6, 7 and 8, located on top of an aerated distribution box 77 above a series of ground storage or component silos 80 through 89. The alleviator 76 relieves the air pressure in the material stream and the material is discharged past a sampling device 78 into the distribution box 77. Material is discharged from distribution box 77 to one of the ground storage or component silos. The air passing from alleviator 76 is filtered by a dust collector 138.

A representative sample of the material discharging from alleviator 76 is substantially continuously drawn off by sampling device 78 which diverts the material to an on-stream sorting analyzer 79. Sampling device 78 may be of the type disclosed in U.S. Patent No. 2,668,447, or U.S. Patent No. 3,000,219, or of any other suitable design.

The sorting analyzer 79 preferably is of the type disclosed in the General Electric Industrial Product Data Sheet A4971–73, May 1, 1961, which can continuously analyze a moving stream of material. This analyzer analyzes the material according to the percentages of preselected components or elements. For example, the analyzer may be preset to determine the percentage of calcium, silicon, iron and aluminum, and analyzer 79 simultaneously and continuously measures the percentage of each of these components. The analyzer signals this information to a conventional computer 79′, FIG. 1b, which in turn controls flow gate valves 89′ and 90 through 93 in distribution box 77 through line 79″ and branch lines leading to each of the flow gate valves. The computer may be, for example, a Number 312 General Electric Computer System. Acting upon the analyses of the material it receives from the analyzer, the computer operates the respective gate valves 89′, 90–93 to distribute the material passing from the distribution box 77 to the component silos 80–89 which respectively contain various types of material. Each component silo contains material having compositions falling within a predetermined chemical range or classification. In the instant application, ranges of high lime, medium lime, low lime, high iron, high silica and high alumina are preset into the computer. In accordance with the analysis of the material by analyzer 79, the computer 79′ will classify the material into one of the chemical ranges or classifications and operate the appropriate valves to divert the material to a component silo containing such classification of material.

The number and ranges of the predetermined chemical classifications programmed into the computer 79′ are dependent upon the chemistry of the material in the particular quarry. These classifications can be changed if and when operating conditions warrant it.

As previously mentioned, it is desirable that a single kind of quarried material be discharged from the rock storage silos and fed through the grinding mill at a time, because an improved efficiency is obtained by having the ball mill grind only a single grade of material at a given time. Additionally, feeding one kind of quarried material at a time reduces the number of times the various flow gates in distribution box 77 need be regulated by the computer acting in response to signals from the sorting analyzer.

Figure 9:
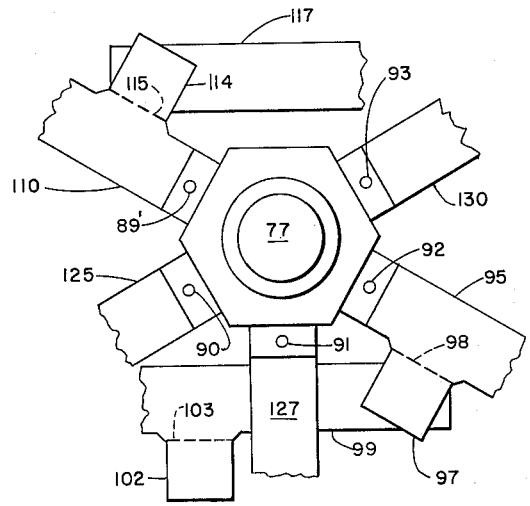
FIG. 9 is an enlarged plan view of the distribution box and connected conveying section shown in FIG. 8.
Figure 8:
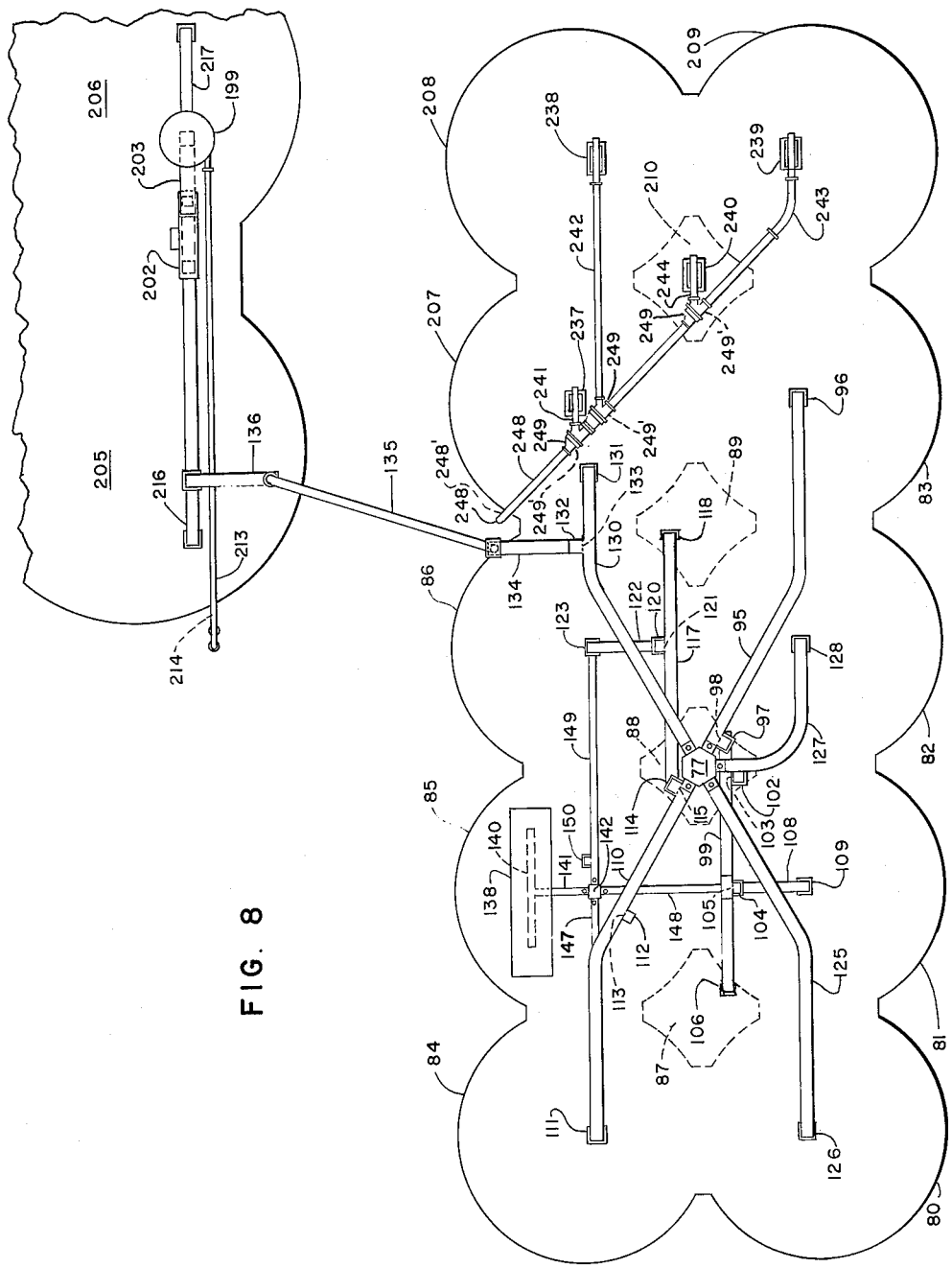
FIG. 8 is a plan view of the ground storage or component silos showing the distribution box and conveying sections for distributing material to the silos.

As shown in the drawings, FIGS. 8 and 9, the aerated distribution box 77 is of hexagonal shape and contains the five gates 89′ and 90 through 93, respectively. A plurality of fluidized gravity conveying sections 95, 110, 125, 127 and 130, hereinafter more specifically discussed, radiate from the respective sides of the distribution box 77. Fluidized gravity conveying sections are well known in the art and include an air-pervious wall or deck separating a plenum chamber from a material-conveying chamber along the length of the conveying section. Air is introduced from the plenum chamber, through the pervious wall or deck to aerate the pulverulent material in the conveying section such that the angle of repose of the material is considerably reduced. The conveying sections which preferably are of the type shown in Schemm U.S. Patent No. 2,527,455, are slightly inclined to the horizontal and the aerated material flows along the decks of the sections like a fluid, due to the force of gravity. Similarly, the aerated junction or distribution box 77 has an air-pervious wall or deck underlying the material in the box and air is passed through the deck to aerate and fluidize the material so that it readily discharges from the aerated junction box when one of the gate valves is opened.

A gate valve 92 controls flow from the distribution box 77 to fluidize gravity conveying section 95. Conveying section 95 has a discharge outlet 96 overlying silo 83, which contains material having a medium lime content, and a side discharge box 97 connected to a fluidized gravity conveying section 99. Side discharge box 97 has a pivoted flap valve 98 which can be positioned to divert material from conveying section 95 into conveying section 99.

Conveying section 99 has side discharge boxes 102, 104 and discharge box 106 with boxes 102 and 104 controlled by pivoted flap valves 103 and 105, respectively. Side discharge box 102 overlies an inner silo 88 formed between silos 81, 82, 85 and 86, FIG. 8. Side discharge box 104 connects conveying section 99 with a fluidized gravity conveying section 108, the latter having an outlet 109 discharging into storage silo 81. Discharge box 106 connects conveying section 99 with an inner silo 87 located between outer wall portions of silos 80, 81, 84 and 85.

Silos 81, 83, 87 and 88 are used for storing material of medium lime content. Several such lime silos are needed because a larger volume of this material is used than of any other material in forming the feed for the cement kiln.

When distribution box gate valve 92 is opened, the incoming material will be supplied to one of said lime silos depending upon the position of the flap valves 98, 103, and 105. The lime silos have conventional high level indicators so that after one of the lime silos is filled, the flap valves will be positioned so that additional material passing gate valve 92 will be diverted into one of the other appropriate lime silos.

Gate valve 89′ controls flow of material from distribution box 77 to fluidized gravity conveying section 110. Fludized gravity conveying section 110 has an outlet 111 extending into silo 84, a side discharge box 112 controlled by flap valve 113 overlying silo 85, and a side discharge box 114 controlled by flap valve 115 connecting conveying section 110 with fluidized gravity conveying section 117. Conveying section 117 has a discharge outlet 118 overlying an inner silo 89, and a side discharge box 120 controlled by flap valve 121. Side discharge box 120 connects conveying section 117 to conveying section 122, the latter having an outlet 123 leading into silo 86.

Silos 84, 85, 89 and 86 respectively contain material generally classified as high iron, high silica, high alumina and high alumina contents. Since the volume of these materials used is quite small in comparison to the material in the various limestone silos, it is unnecessary to have individual distribution box gates for each of these silos. A single distribution box gate 89' controls the dicharge of high iron, high silica and high alumina from the distribution box, and flap valves 113 and 115 need to be properly positioned when gate valve 89' is opened. The flap valves 113 and 115 are controlled by computer signals from line 79" (FIG. 1b) and branch lines leading to the respective flap valves, similarly as are the distribution box gates valves 89' and 90 through 93.

If the analyzer indicates that the material entering the distribution box 77 is within the high iron range, the computer will open gate valve 89' and position the flap gates 113 and 115, as shown in FIGS. 8 and 9. Material discharged past gate 89' into conveyor section 110 will be conveyed through outlet 111 into component silo 84.

If material falling within the high alumina range enters the distribution box 77, the computer in response to a signal from the sorting analyzer opens gate valve 89' and actuates pivoted flap gate 115 so that material entering conveying section 110 will be diverted into conveying section 117. Depending on the position of pivoted valve 121, material will be deposited in silo 86 or 89. A high bin level signal in silo 89 actuates valve 121 so that when inner high alumina silo 89 is filled additional high alumina material will be diverted into the high alumina silo 86.

Gate valve 90 controls the flow of material to fluidized gravity conveying section 125. Conveying section 125 has an outlet 126 connecting distribution box 77 with silo 80 which contains material having a high lime content.

Gate valve 91 controls the flow of material from distribution box 77 to fluidized gravity conveying section 127, the latter having an outlet 128 overlying silo 82 which contains material having low lime content.

The gate valves in distribution box 77 and pivoted flap valves 113 and 115 are pneumatically operated under the control of the computer. While flap valves 98, 103, 105 and 121 have been disclosed as being controlled by high level bin signals, these valves also could be controlled in the computer, if desired.

The novel arrangement of analyzer, computer, distribution box, fluidized gravity conveying sections, gate valves and flap valves enables the automatic feeding of material into the proper component silos so that each silo contains a type of material having a composition within a predetermined chemical range, that is, material having various components within predetermined limits.

In addition to gate valves 89', 90, 91 and 92, distribution box 77 has a gate valve 93 controlling flow to fluidized gravity conveying section 130. Normally gate valve 93 remains in a closed position, the sole purpose of gate valve 93 and conveying section 130 being to by-pass material to blending, or kiln-feed storage silos in an emergency. For example, should it be necessary to close down the automatic system due to damage to equipment, the present apparatus can be used similarly as existing cement plants wherein material would be discharged from the rock storage silos 31 to 38 in the proper proportions and the materials combined ahead of the component silos 80 to 89. The material would then be sent through gate valve 93 into fluidized gravity conveying section 130 to blending silo 205 or to the kiln feed silo 207.

Conveying section 130 has an outlet 131 feeding into silo 207 and a side discharge box 132 controlled by flap valve 133 connecting conveying section 130 to a blending silo 205 by fluidized gravity conveying section 134, pipe 135, and fluidized gravity conveying sections 136 and 216.

Figure 10:
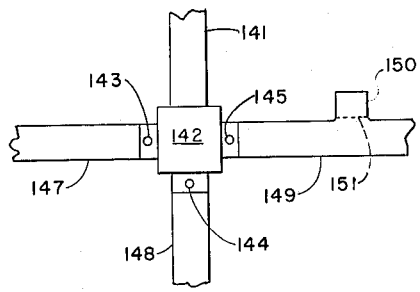
FIG. 10 is an enlarged plan view of the dust collector junction box and connected conveying sections shown in FIG. 8.

A dust collector 138 is mounted on top of component silo 85. The inlet of dust collector 138 is connected by a duct 139 to the air outlet of the alleviator 76. The dust collector has a hopper bottom 138' containing fluidized gravity conveying sections 140 wherein filtered dust is discharged through the outlet into fluidized gravity conveying section 141 containing a non-return valve (not shown). Conveying section 141 slopes downwardly into an aerated junction box 142, FIGS. 8 and 10. The aerated junction box 142 is of rectangular shape and contains three gate valves 143, 144 and 145 which control flow from the junction box to three separate fluidized gravity conveying sections 147, 148 and 149, respectively. One of the three gate valves 143, 144 or 145 will be opened so that the collected dust may be conveyed to the proper component silo. Fluidized gravity conveyor 149 has a side discharge box 150 containing a pivoted flap valve 151 (FIG. 10). When material is conveyed to component silo 84, gate valve 143 at junction box 142 is open so that dust from the dust collector is conveyed through conveying section 147 to the silo 84. The side discharge box 150 is used for conveying return dust to the silica silo 85. For example, when material is fed to silo 85, then gate 145 is open and flap gate valve 151 is positioned to divert material entering conveying section 149 into the silica silo 85. There are no returns from the dust collector to the high lime or low lime component silos 80 and 82, respectively. If the collected dust is high lime or low lime material, it is returned to the medium lime silo 81 since the small quantity of high lime or low lime dust does not materially affect the combined material of medium lime content in silo 81.

The gate valves in the junction box are actuated by conventional pneumatic operators which preferably are controlled by limit switches on the gate valves of the distribution box 77 and pivoted flap valves 113, 115 and 121 so that the collected dust is diverted to silos containing the material of similar composition. However, the valves 143–145 could be controlled by computer 79' if desired.

Component silos 80 through 86 inclusive have conical bottoms 153 with outlets 154 controlled by off-on rotary valves 190. Each of the conical bottoms is equipped with three spaced air-pervious sections 155 radiating inwardly and downwardly from the outer wall and terminating adjacent to the outlet 154 (FIG. 11). Material is aerated by gas or air passed through sections 155 and is discharged from the component silos through the respective outlets 154, through fluidizing conveying sections to a constant level box 156 from where the material is discharged into either or both of two pumps 187 and 188 which pump the material into one of two blending silos 205 and 206.

Material of a high iron content discharging from component silo 84 flows through outlet 154, fluidized gravity conveying section 158, constant level box 159, fluidized gravity conveying sections 160, 161, 162 and into the constant level box 156.

Material discharging from component silo 80 flows through fluidized conveying section 164, through constant level box 165 and fluidized gravity conveying sections 161 and 162 into constant level box 156.

Material from component silo 81 is fed to constant level box 156 by means of fluidized gravity conveying section 166, constant level box 167 and fluidized gravity conveying sections 168, 161 and 162.

The silica silo 85 discharges through opening 154, through a fluidized gravity conveying section 170, constant level box 171, fluidizing conveying sections 172, 161 and 162 into constant level box 156.

Material in component silo 82 flows through outlet 154 to the constant level box 156 by means of a fluidizing gravity conveying section 173, constant level box 174, fluidizing gravity conveying sections 175, 176 and 162.

Material in the average lime silo 83 is discharged through outlet 154 to constant level box 156 by means of fluidizing gravity conveying section 177, constant level box 178, fluidizing gravity conveying sections 179, 176 and 162.

Material discharged from the alumina component silo 86 flows by means of fluidizing gravity conveying section 181, constant level box 182, fluidizing gravity conveying sections 183, 176 and 162 to constant level box 156.

Due to the small capacities of the inner silos 87, 88 and 89, these silos preferably do not have individual outlets and constant level boxes because the expense does not warrant it.

As is shown in FIG. 11, a wall portion common to silo 81 and silo 87 has an opening 87' near the bottom of the silo wherein material in silo 87 can be discharged into silo 81 and through outlet 154 of silo 81 to constant level box 156.

Similarly openings 88' and 89' in wall portion of silos 81 and 86 permit removal of material from silos 88 and 89, respectively.

Silos 87, 88 and 89 preferably have individual inlets as previously described to enable complete filling of these silos, although they may receive material from adjacent silos, if desired.

From the constant level box 156 material is fed through either or both of fluidizing gravity conveying sections 185 and 186 to pumps 187 and 188, respectively.

Figure 1B:
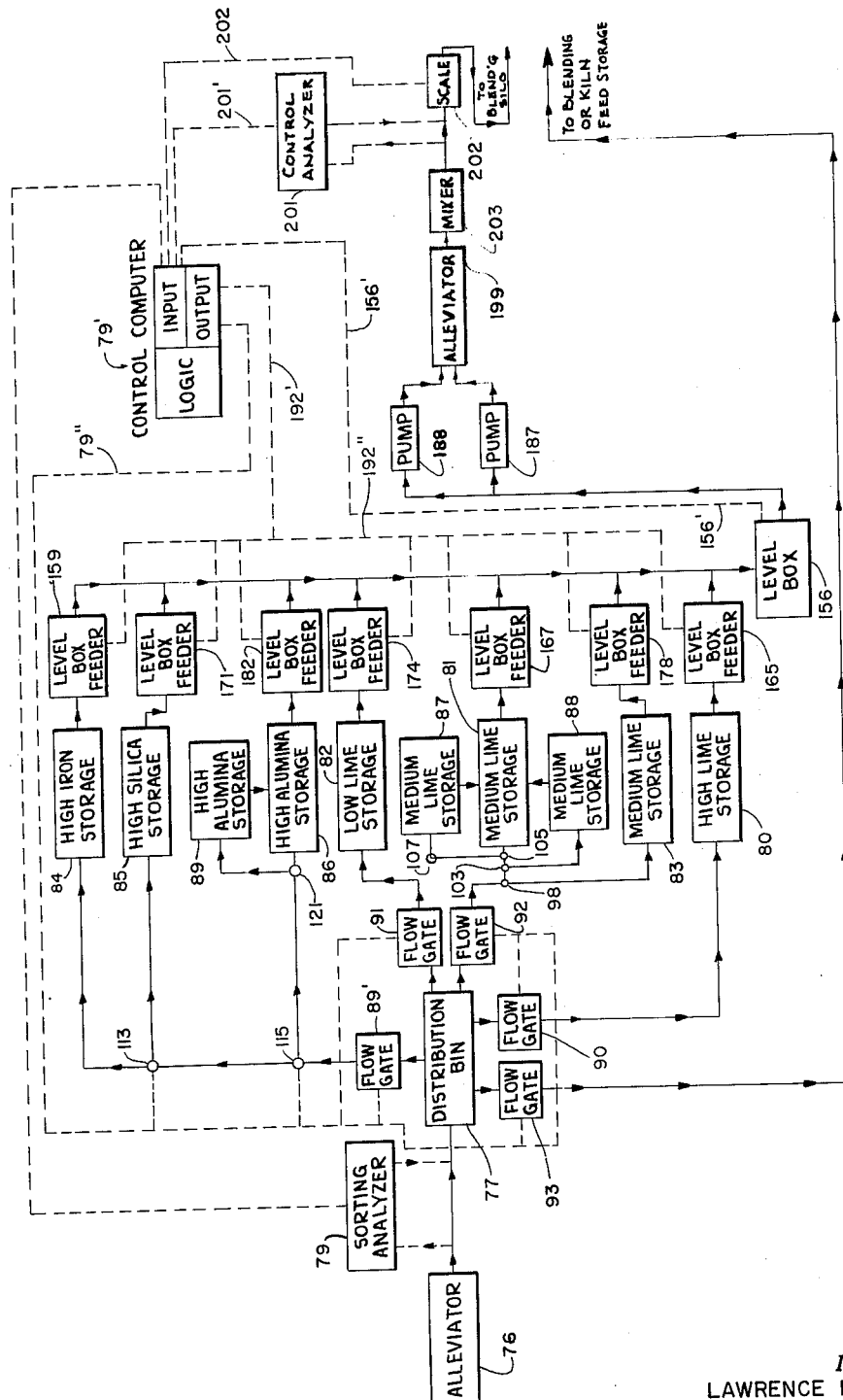
Figure 1C:
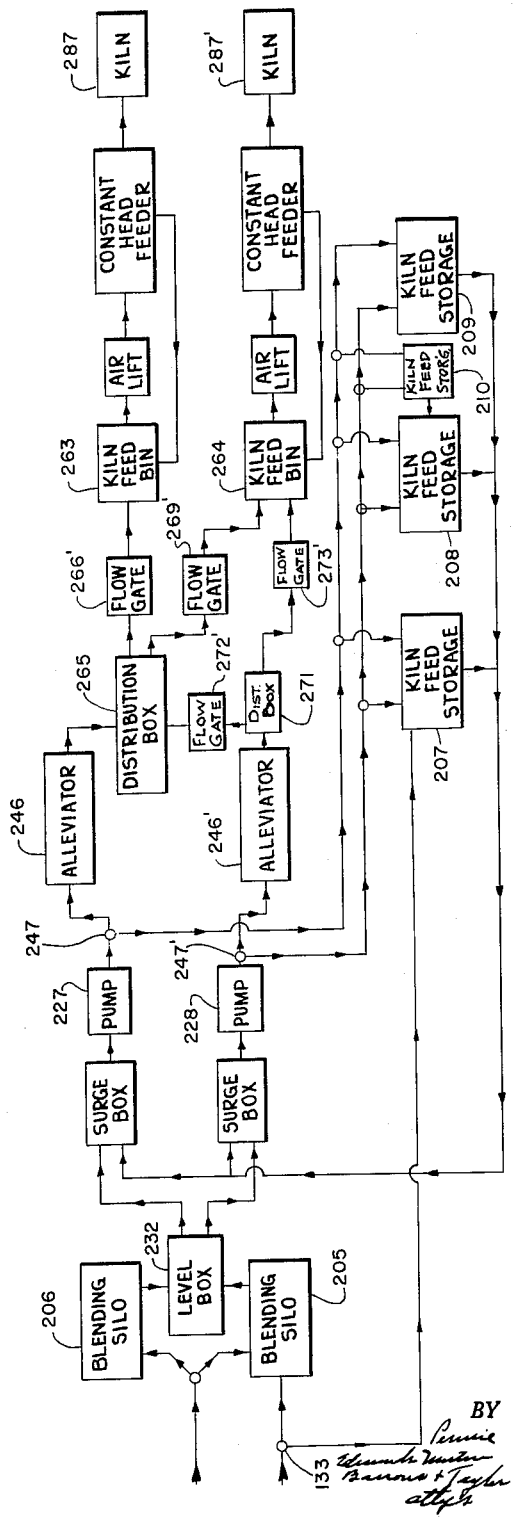
Figure 6:
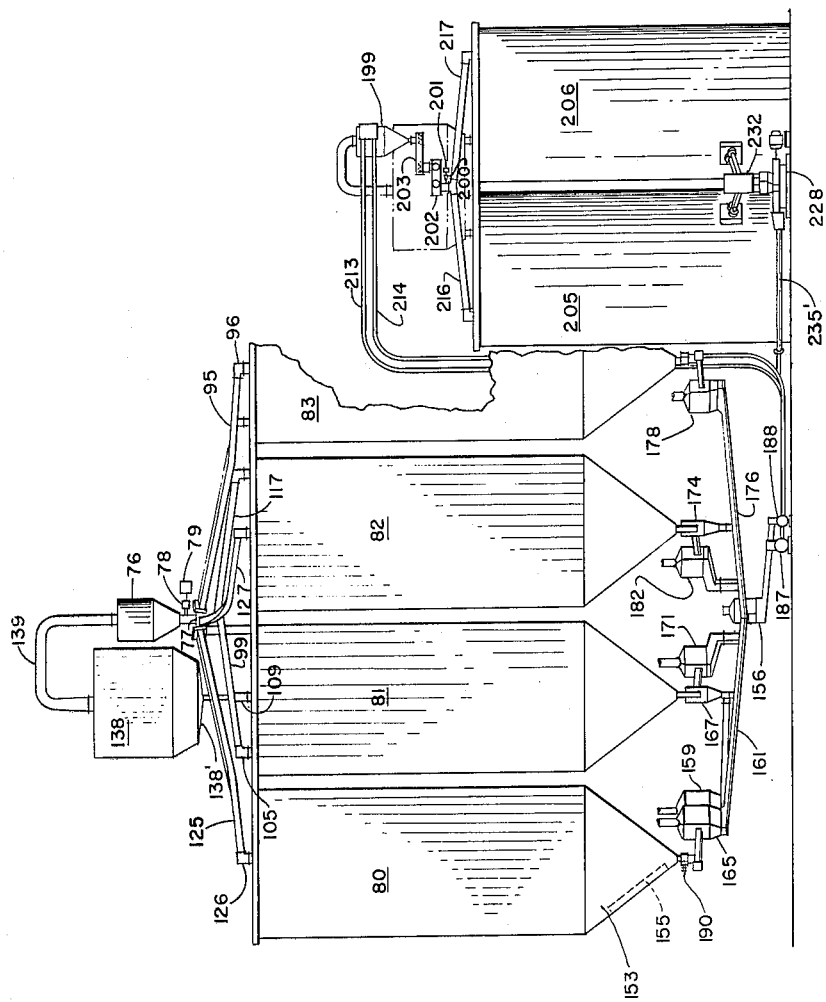
FIG. 6 is a partial side view of the ground storage or component silos and blending silos.

Each of the component silos 80 through 86 is provided with an on-off rotary valve 190, FIG. 6, controlling outlet 154. Each of the fluidizing gravity conveying sections connecting the respective silos with the constant level boxes is provided with a modulating rotary butterfly valve 191 (FIG. 12), which is pneumatically operated and positioned by a bubble tube control to maintain a constant level of material in constant level boxes 159, 165, 167, 171, 174, 178 and 182, as set forth below. In place of rotary butterfly valves 191, modulating flow gate valves may be used. Discharge from the respective constant level boxes is controlled by modulating flow gate valves 192 (FIG. 12), pneumatically actuated and controlled by signals from the computer through lines 192' and 192" and branch lines leading from line 192" to the respective constant level boxes (FIG. 1b). A regulated flow of material is fed from the constant level boxes through the fluidized gravity conveying sections into constant level box 156. The constant level boxes and the modulating valves associated therewith are referred to as level box feeders in the schematic block diagram in FIG. 1b. A dust collector (not shown) is provided to relieve and purify the air leaving the fluidized gravity conveying sections.

Figure 12:
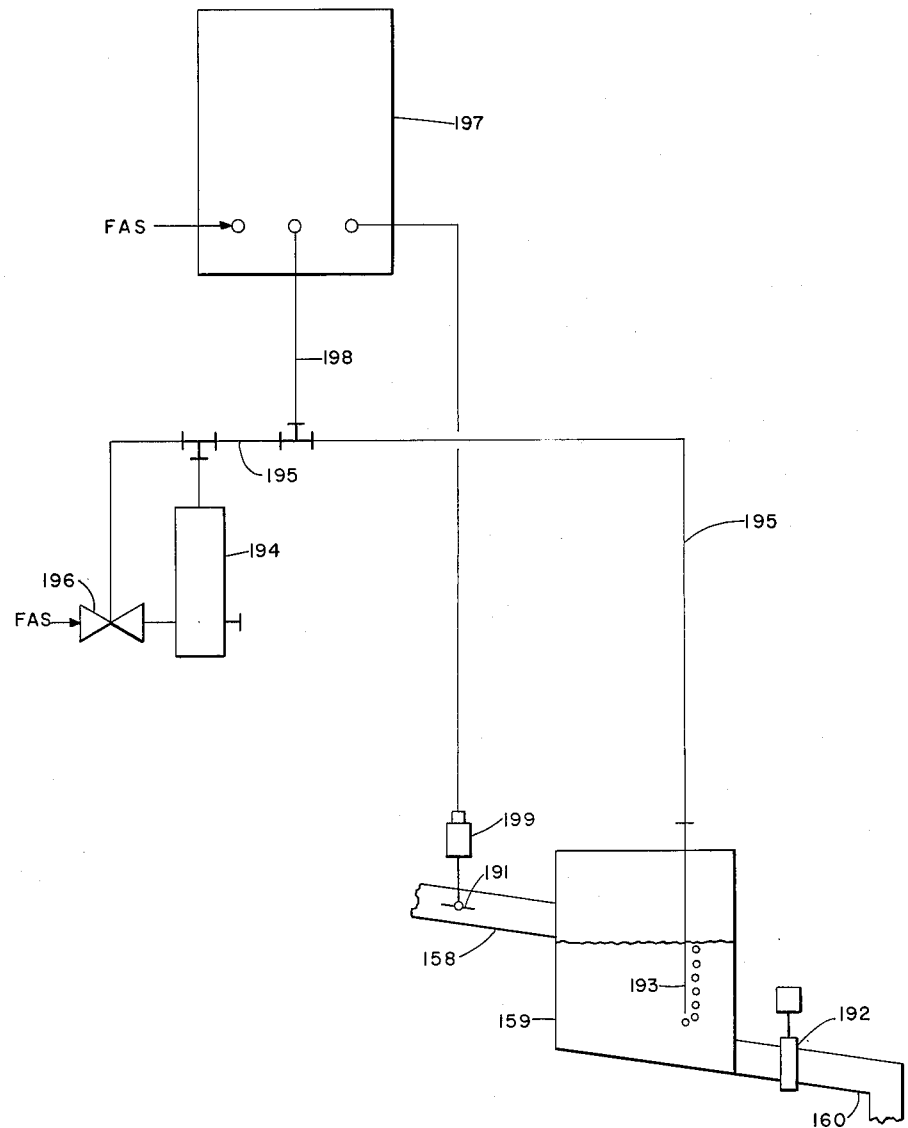
FIG. 12 is a diagrammatic view of a typical level-box feeder and control mechanism used to regulate discharge from the ground-material storage or component silos.

A detailed schematic illustration of constant level box 159, modulating valves 191 and 192, and the bubble tube control is shown in FIG. 12. A bubble tube 193 comprises an ordinary pipe open at its lower end. Clean, filtered air at low pressure from a filtered air source (FAS), is fed through flow meter 194 and pipe 195 to the bubble tube 193. The flow meter 194 makes it possible to set the bubbling rate at a positive, slow trickle of gas. The material in constant level box 159 above the lower end of the bubble tube 193 produces a back pressure against the flow of gas from the bubble tube 193 which is proportional to the depth of the overlying head of material. This back pressure registers with an indicating pneumatic controller 197 by means of pipes 195 and 198. The controller 197, in turn, when connected with a filtered air source (FAS), produces an output pressure signal inversely proportional to the back pressure in bubble tube 193, that is, the controller output pressure decreases as back pressure increases and vice versa. The modulating valve 191 which admits fluidized material from component silo 84 through fluidized gravity conveying section 158 to the constant level box 159 is regulated by an air operator 199 which positions valve 191 in accordance with the pressure signal given by the controller 197. The controller 197 closes valve 191 with a decreased pressure output signal (caused by an increased back pressure in bubble tube 193), and opens valve 191 with an increased pressure output signal (caused by a decreased back pressure in the bubble tube). The modulating valve 191 is infinitely variable and ranges from full closed to full open position in response to variation of the output signals from the controller 197.

The constant level box control of FIG. 12 is equipped with a purge assembly which has the important function of keeping the bubble tube 193 blown out to prevent blocking thereof by the material in the constant level box 159. The purge assembly consists of a differential pressure regulator 196 and is combined with the trickle flow meter 194. Differential regulator 196 operates to continue supplying trickle air at a pressure that is higher by a fixed amount than the back pressure that is built up in bubble tube 193. Thus, the trickle air purges constantly since it is supplied at a pressure that always exceeds the pressure within the bubble tube. Controller 197 and the motor for valve 191 may be of the type disclosed in Bulletin B-50-3, 1957, of Conoflow Corporation, Philadelphia, Pennsylvania. Constant level boxes 159, 165, 167, 171, 174, 178 and 182 are of similar construction with the same valving arrangement and, therefore, only level box 159 and the related valves have been described in detail.

The constant level boxes result in a close regulation of the material flow from the component silos to the pumping system. By means of the bubble tube controls a constant level of material is maintained in the constant level boxes. It is easy to regulate the outflow of material from the constant level boxes since the discharge of material through the modulating gate valves 192 is directly proportional to the valve settings due to the constant head of material supplying the valves 192.

The respective modulating gate valves 192 controlling flow from the constant level boxes of the component silos to the constant level box 156 are pneumatically operated in response to operating signals from the computer through lines 192' and 192" wherein the valves 192 are set to result in a raw mix material having a chemical composition within prescribed predetermined limits. Material fed to the pumps 187 and 188, FIG. 11, from the constant level box 156 is pumped into an alleviator 199 located above blending silos 205 and 206, FIGS. 6, 7 and 8. The alleviator relieves the air pressure in the material stream and the material flows through a mixer 203 onto a scale or continuous weighing device 202 and into one of the blending silos. A sampling device 200 substantially continuously withdraws a sample of material discharging from the alleviator and feeds it to a control analyzer 201 which continuously and simultaneously measures the percentages of the various preselected elements or components of the material. The weighing device 202 continuously senses the weight of the material passing to the blending silos.

The sampler 200, control analyzer 201 and weighing device 202 together serve as an analyzing means providing the computer 79' with combined signals through lines 201' and 202' indicating a weighted percentage of the various components received from the component silos. Since the modulating valves 192 were initially set to draw the required proportion of material from the various component silos to achieve a mixture having the prescribed or required proportions within predetermined limits, the material being discharged from the alleviator 199 into the blending silo 205 or 206 should have a chemical composition within the predetermined limits.

However, since each component silo contains material having a composition which is variable within a predetermined chemical range, the actual composition of the combined materials discharging from the several component silos may vary. In response to signals from the analazying means, that is, the control analyzer 201 and scale 202, the presence and amount of any variation in the chemical composition of the combined materials is recognized by the computer. When the composition deviates outside a predetermined range, programmed into the computer, the computer readjusts modulating valves 192 to correct any deficiencies or excesses in one or more of the components previously fed to the blending silo to effect a combined material containing the various preselected components within predetermined limits. The computer has the necessary memory over a determined time interval so that in the event any correction is insufficient, or if there is an overcorrection for one or more of the components, the computer can compensate for the previous deviation by subsequently adjusting the modulating valves 192 to supply the necessary correction to maintain a combined material in the blending silo having a chemical composition within the prescribed predetermined chemical limits.

While the computer may be programmed for continuous adjustment of the modulating valves 192, it is generally preferable to have the computer adjust the valve settings at established time intervals. The frequency of the corrections is based to a large extent upon the magnitude of the chemical ranges of the component silo materials. In other words, the narrower the chemical ranges, the less frequently need the modulating valves 192 be adjusted to provide a combined material having the various components in the required proportions. In most installations, according to the present invention, programing the computer to adjust the modulating valves at ten-minute intervals would provide the control necessary to effect a combined material having the desired chemical composition. In some installations, a longer time interval between corrections may be entirely satisfactory.

The purpose of constant level box 156 is to provide a constant head of material ahead of pumps 187 and 188 to provide a relatively stable rate of delivery therefrom to the blending silo. Constant level box 156 is similar in construction to the constant-level boxes directly associated with the component silos and contains a bubble tube which senses the level of the material and sends a signal through a controller to the computer 79' through line 156'. The computer, in turn, proportionately adjusts the modulating gate valves 192 which are in use at the time to maintain a constant level of material in the level box 156. In other words, when the level of material in level box 156 changes for any reason, the level sensing device relays the information to the computer, which then adjusts the appropriate valves 192 proportionately to change the combined volume rate of flow of material discharging from the component silos, while nevertheless maintaining the proper proportioning. The signals from the computer for regulating modulating gate valves 192 are a result of the information supplied to it by the control analyzer 201 and scale 202, which indicate any necessary change in proportioning of the valve openings, and are the further result of the information supplied to the computer by the bubble tube control which prescribes any change in the volume necessary to maintain a constant level in level box 156. The computer superimposes its proportioning or composition control signals and its volume control signals and adjusts the various modulating gate valves 192 accordingly to maintain a constant level of material in the constant level box 156 while, at the same time, maintaining the prescribed composition.

Two fluidized gravity conveying sections 185 and 186, respectively, connect constant level box 156 to pumps 187 and 188. Conveying section 185 contains a pneumatically operated gate valve 208'. Similarly, fluidized gravity conveying section 186 has a pneumatically operated gate valve 210'. When operating blending silos 205 and 206 on a batch basis these gate valves 208' and 210' preferably are either fully open or fully closed, so that when operating, pumps 187 and 188 will operate near full capacity. When operating on a continuous basis, valves 208' and 210' preferably are under the control of a bubble tube within the blending silo as will be subsequently described. Because constant level box 156 maintains a constant head of material, the feed to pumps 187 and 188 will be proportional to the valve openings and will be stable for a given valve setting.

Figure 7:
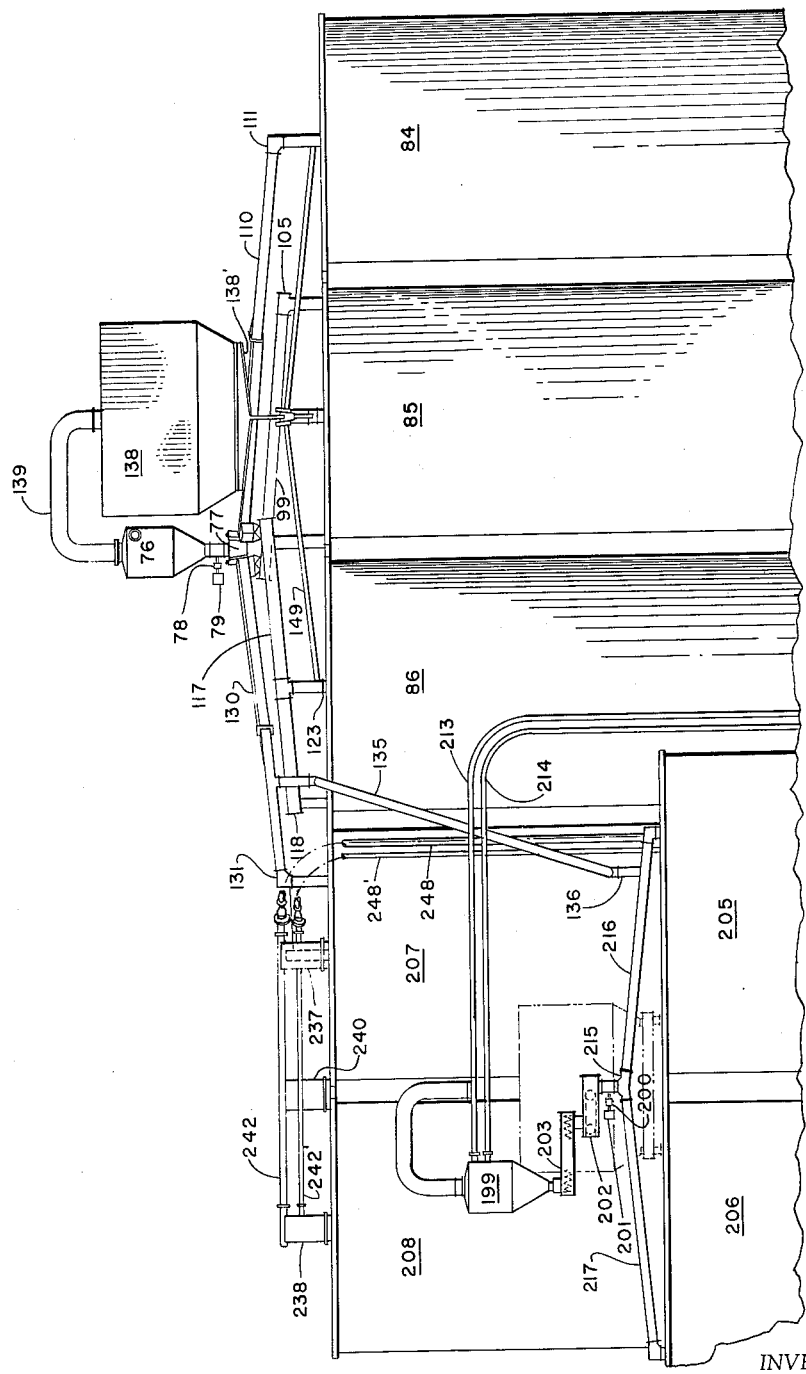
FIG. 7 is a partial view of another side of the ground storage or component silos and blending silos of FIG. 6.

The material is pumped by pumps 187 and 188 to alleviator 199, FIGS. 6, 7 and 8, by means of piping 213 and 214, respectively. Material discharged from alleviator passes through mixer 203 onto weighing device 202 as previously mentioned, and then passes through a junction box 215 to either of two fluidized gravity conveying sections 216 and 217 to blending silo 205 and 206, respectively.

Junction box 215 contains a flap valve (not shown) which diverts material into either of conveying sections 216 and 217.

Pumps 187 and 188 and alleviator 199 could be replaced by elevators or other suitable type of conveyors, if desired.

As previously mentioned, an emergency by-pass 130, 134, 135 connects distribution box 77 with conveying section 216 so that material may be supplied to blending silo 205 or kiln feed storage silo 207 by by-passing the ground storage or component silos.

Blending silos 205 and 206 may be similar in construction to the type disclosed in the Dilcher, et al. U.S. Patent No. 2,844,361. Material is conveyed to one of the blending silos 205 and 206 through the fluidized gravity conveying sections located above the silos. Material is withdrawn from one of the silos through discharge openings, located near the bottom of the blending silos.

The material may be fed into and discharged from a blending silo on a batch basis or on a continuous basis. In either case, the control analyzer and the scale provide the computer with a continuous account of the composition and amount of the material fed to the blending silo.

When operating on a batch basis, the computer is provided with a memory at least sufficient to accumulate and retain knowledge of the amount of each component fed to the blending silo during a given batch. At specified time intervals, the computer will adjust the modulating valves 192, on the basis of the composition and amount of material previously fed to the blending silo during this batch, to make the necessary corrections to effect a combined material in the blending silo having a chemical composition within the predetermined limits needed for burning into the desired cement clinker.

However, operation of a blending silo on a batch basis requires greater storage capacity and a larger capacity conveying system as compared with a blending silo operated on a continuous basis, that is, with continuous feeding into and continuous withdrawal from a blending silo. Therefore, for economy reasons, continuous blending is frequently preferred.

When operating a blending silo on a continuous basis, it is highly desirable to establish the flow characteristics of the material within the blending silo, so that the computer may be programed to make the adjustments of the component silo modulating valves 192 on the basis of material actually in the blending silo at the time the adjustments are made. Depending, inter alia, upon the feed rates to and from the blending silo, the silo size, the amount of material in a silo, and the length of a blending cycle, the material fed to the blending silo during a time interval follows a predictable pattern of flow. For example, suppose a quantity of material is fed to the blending silo during a particular time interval. Due to continuous withdrawal from the blending silo, a negligible amount of this quantity may be withdrawn almost immediately. At some future time a larger portion of this quantity will have been discharged from the blending silo, and so on until at some time all or all but a trace of that specific volume of the material fed to the blending silo during the particular time interval has been discharged from the blending silo. For given conditions, it can be empirically determined what percentages of material fed during a particular time interval are still within the blending silo at subsequent periods of time, and this relationship can then be represented by a flow equation. Once established, the flow equation can be programed into the computer, so that the computer's memory and consequent corrective adjustments will be based on the composition of material actually contained in the blending silo at a given moment.

When the blending silo of FIGS. 6–8 is operated on a continuous basis, means are provided to maintain the material level in the blending silo within workable, preferably relatively stable, limits. A bubble tube (not shown), similar to those in the previously-described constant level boxes, is located within the blending silo and connected through a controller to valves 208' and 210' controlling the flow from level box 156 to pumps 187 and 188. By means of this bubble tube and controller, valves 208' and 210' are modulated to maintain a substantially constant volume of material in the blending silo.

Another means which could be used to maintain the required volume or workable level of material in the blending silo would be high and low level signals in the blending silo to control the level therein.

Each of the blending silos 205 and 206 is equipped with two conduits 219, 221 connecting the respective silos with a fluidized gravity conveying section 233 leading to a constant level box 232 (FIG. 11). Since the details are the same, only one pair of connecting conduits will be described.

Conduit 219 contains a manually controlled valve 220 which normally is closed. Conduit 221 contains a manually operated gate valve 223 which can be closed in an emergency but which is normally open. Valve 222 is an off-on pneumatically actuated butterfly valve. Located between valve 222 and conveying section 233 in conduit 221 is a modulating butterfly valve 225 which is connected to a bubble tube control having a sensing element located in constant level box 232 similar in construction to the constant level boxes previously described. Modulating valve 225 maintains a constant head of material in constant level box 232. Normally, material in silo 205 is discharged through conduit 221, whereas conduit 219 is used on an emergency basis.

Constant level box 232 is connected to pumps 227 and 228 by fluidized gravity conveying sections 229 and 230, respectively. Each of the conveying sections 229 and 230 is equipped with an off-on pneumatically operated gate valve with a manual limiting means.

The primary purpose of constant level box 232 is to facilitate a safe material-pressure reduction between the blending silos and pumps 227 and 228. The powdered material under full aeration in a blending silo exerts a fluid pressure or "head" at the bottom of the silo. The pressure exerted by high heads of aerated material is considerably more severe than the ordinary conveying system can safely withstand. To prevent distortion and possible rupture from excessive internal pressure in the conveying system, and to avoid the cost of special high-strength designs, constant level box 232 acts as a surge chamber to hold back extreme silo pressure and avoids the possibility of these extreme pressures reaching the conveying systems preceding pumps 227 and 228 whereby it could do severe damage.

In addition to facilitating a safe pressure reduction constant level box 232 maintains a constant head of material ahead of flow control valves in conveying sections 229 and 230 so that the flow of material from the blending silos will be relatively stable and will be proportional to the respective settings of the flow control valves. Thus a controlled fluid withdrawal is provided to the pumps 227 and 228 from the blending silos.

Figure 14:
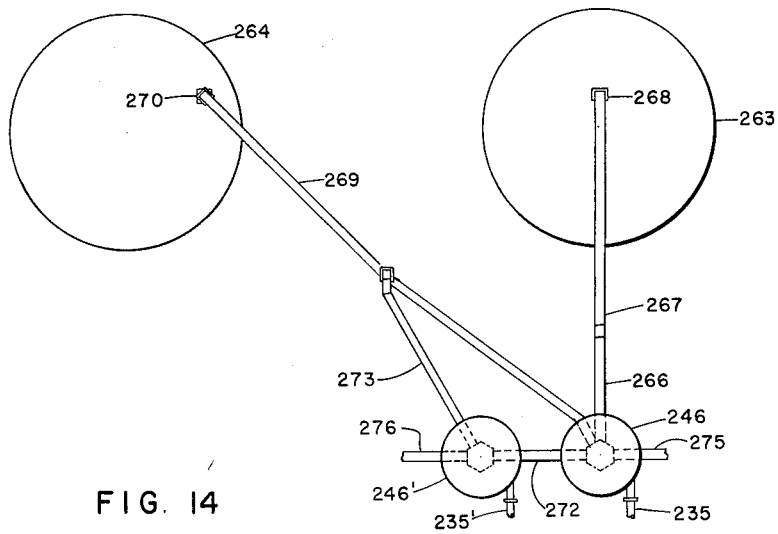
FIG. 14 is a plan view of the equipment shown in FIG. 15.
Figure 15:
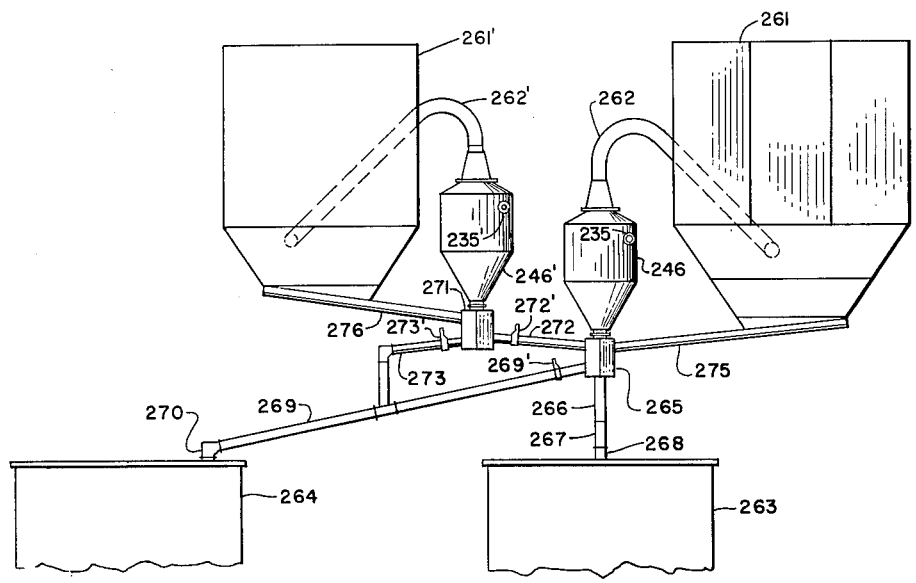
FIG. 15 is a partial end view of the alleviators, distribution boxes, kiln feed bins and connected conveying sections.

Material discharged from blending silos 205 and 206 is pneumatically conveyed by pumps 227 and 228 to alleviators 246 and 246' above kiln feed bins 263 and 264, FIGS 14 and 15, in the kiln area or to the kiln feed storage silos 207 to 210, FIGS. 8 and 11.

Piping 235 and 235', FIG. 11, connect pumps 227 and 228, respectively, with cyclone separators or alleviators 246 and 246', which separate the air from the material and discharge the material to kiln feed bins 263 and 264, FIGS. 14 and 15. Piping 235 and 235' have diverter valves 247 and 247', respectively, with connected branch piping 248 and 248' extending above kiln feed storage silos 207, 208, 209 and 210, FIG. 8. Kiln feed storage silos 207–210, respectively, have feed spouts 237, 238, 239 and 240.

Branch conduits 241, 242, 243 and 244, respectively, connect each of the feed spouts 237–240 with one of several diverter valves 249 in conduit 248. Similarly, branch conduits 241', 242', etc., connect feed spouts 237 to 240 with valves 249' in conduit 248'.

Depending upon the positions of the valves 247, 247', material will be pumped from pumps 227 and 228 to the alleviators 246 and 246', or will be diverted into the branch conduits 248 and 248' to kiln feed storage.

The positions of the valves 249, 249' in the conduits 248 and 248' determine which of the kiln feed storage silos 207–210 receives material diverted through conduits 248 and 248'. The kiln feed storage silos 207–210 are provided with a conventional dust collector (not shown).

To improve valve service, it is desirable to shut down the supply of material from the blending silos to either of the pumps 227 and 228 and/or the pumps themselves before the valves in that particular transport system are actuated.

For example, if material is being pumped from pump 227 to alleviator 246 and it is desired to divert material to kiln feed storage, the supply of material to pump 227 will be shut off before the valve 247 is actuated. After the system is free from all material, the valve 247 is actuated into a diverting position and the several valves 249 in conduit 248 are properly positioned, after which material feed from the blending silos to pump 227 is resumed.

Kiln feed bins 263 and 264 contain high and low level bin signals and pumps 227 and 228 maintain a supply of material in the kiln feed bins within these limits. Hence, pumps 227 and 228 may be used intermittently.

However, in the preferred embodiment, the high level signals in kiln feed bins 263 and 264 shut off the feed to pumps 227 and 228, respectively, when material in the kiln feed bins reaches the high levels, and after a time delay necessary to clear the conveying system of material, actuate valves 247 and 247' and reopen the corresponding valves in conveying sections 229 and 230, so that subsequent material discharging from the blending silo will be diverted to kiln feed storage. Additionally, each of kiln feed storage silos 207 to 210 contains a high level bin signal controlling the diverter valves 249, 249' in lines 248 and 248' so that upon filling of one of the kiln feed storage silos to the desired extent additional material is diverted to one of the other storage silos. When all of the kiln feed bins are full and there is no available kiln feed storage, the high level signal in the last-filled kiln feed bin shuts down the supplying pump and stops further material delivery. When further material is needed, as indicated by the low level signal in a kiln feed bin, one of the pumps will be operated to again supply material to the system.

Material from kiln feed storage silos 207, 208, and 209 may be discharged into either of pumps 227 or 228, for conveyance of the material to the kiln feed bins 263, 264.

Material in kiln feed storage silo 207 is discharged by means of fluidized gravity conveying sections 250, 251 and discharge box 252 or 253 to pumps 227 or 228, respectively. Silo 208 is connected to discharge boxes 252 and 253 by fluidized gravity conveying sections 255, 256 and 251. Silo 209 is connected to discharge boxes 252 and 253 by conveying sections 257, 256 and 251. Silo 210 preferably does not have its own discharge opening but has an opening 210′ in the common wall of an adjacent silo and discharges through the discharge opening into such adjacent silo and from the discharge opening of the latter. In the apparatus illustrated in the drawing, inner silo 210 discharges through opening 210′ into silo 208 and the material is fed to the discharge boxes 252 or 253 by conveying sections 255, 256 and 251.

Conveying section 251 contains a flap valve 258 which diverts material through conveying section 251 to either of the discharge boxes 252 and 253 for delivery to pumps 227 and 228, respectively.

Each of the kiln feed storage silos has an off-on valve controlling flow from the silos to the conveying sections leading to the pumps 227 and 228. In addition, each kiln feed storage silo preferably has a three-position valve (not shown) regulating discharge to either of the pumps, namely an off-position, and two flow positions corresponding with the respective capacities of pumps 227 and 228. Should pumps 227 and 228 have the same pumping capacity, only one flow position would be required.

One of the kiln feed storage silos is discharged at a time into one or other of pumps 227 and 228, depending upon the position of flap valve 258.

An electrical circuit (not shown) controls the actuation of the storage silo valves, valve 258 and off-on valves 222 and 222′ (FIG. 11), with appropriate interlocks, so that it is impossible to simultaneously feed a single pump from both the blending silos and the kiln feed storage silos.

As previously mentioned, alleviators 246 and 246′ receive material from pumps 227 and 228 through piping 235 and 235′, respectively. Alleviators 246 and 246′ are located at a higher elevation than the upper ends of kiln feed bins 263 and 264 and material is discharged from the alleviators into the kiln feed bins by gravity. Alleviator 246 discharges material directly into an aerated distribution box 265. Fluidized gravity conveying sections 266 and 267 (FIGS. 13, 14) connect aerated distribution box 265 with feed spout 268 located on the upper end of kiln feed bin 263. Gate valve 266′ located in conveying section 266 controls flow from aerated distribution box 265 to kiln feed bin 263.

Fluidized gravity conveying section 269 connects aerated distribution box 265 with feed spout 270 opening into kiln feed bin 264 and contains a gate valve 269′.

Alleviator 246′ overlies and has its material outlet connected to an aerated distribution box 271 which contains two discharge openings near its lower end. Fluidized gravity conveying section 272 having a gate valve 272′ connects one discharge opening in aerated distribution box 271 with the upper end of aerated distribution box 265. Fluidized gravity conveying section 273 containing a gate valve 273′ connects the other discharge opening in aerated distribution box 271 with fluidized gravity conveying section 269 leading to kiln feed bin 264.

The gas outlets of the alleviators 246 and 246′ are connected to dust collectors 261 and 261′, respectively, by ducting 262 and 262′. Dust collector 261 has a fluidized gravity conveying section 275 connecting the collector to aerated distribution box 265. Similarly, dust collector 261′ has a fluidized gravity conveying section 276 connecting collector 261′ with aerated distribution box 271. Conveying sections 275 and 276 contain non-return valves (not shown).

As is well known in the art, the alleviators will separate the air from the material pumped, with the air leaving the top of the allevirators to the dust collectors and the material being discharged into the corresponding distribution box. Dust filtered out in the collectors will be returned to the proper aerated distribution box by means of the connecting fluidized gravity conveying sections.

Material discharged into aerated distribution box 265, from alleviator 246 or from alleviator 246′, aerated distribution box 271 and conveying section 272, is distributed to kiln feed bin 263 via conveying sections 266, 267 and feed spout 268, and/or to kiln feed bin 264 by means of conveying section 269 and feed spout 270.

Material discharged into aerated distribution box 271 is conveyed to aerated distribution box 265 and kiln feed bin 263 by means of conveying section 272, or to kiln feed bin 264 by means of conveying sections 273, 269 and feed spout 270.

Kiln feed bins 263 and 264 are similar to the type disclosed in U.S. patent to Morrow No. 2,509,984 and since each kiln feed bin, feeder and kiln is the same, only one will be described.

Figure 13:
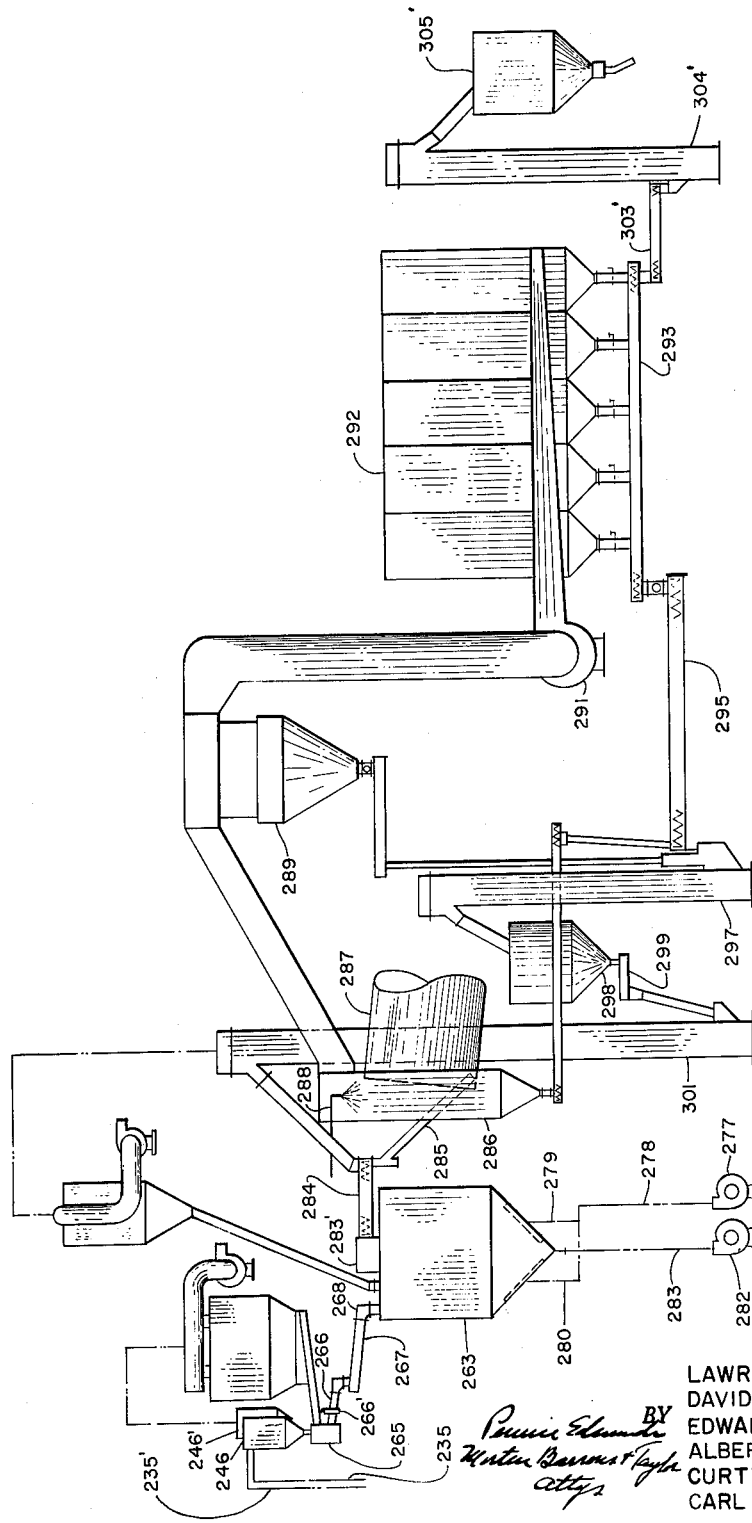
FIG. 13 is a side view of an alleviator, kiln feed bin, constant head feeder and kiln.

As shown in FIG. 13, kiln feed bin 263 receives material from fluidized gravity conveying sections 266 and 267. Gas or air for diffusion purposes is supplied to conventional aeration pads in the interior of bin 263 by means of a blower or gas pump 277, line 278, and branch 279 and 280. Air or gas for elevating purposes is introduced into the bin 263 by means of a pump 282 and line 283. As described in said Patent No. 2,509,984, the kiln feed bin has a pneumatic elevator therein for raising material into a container 283′ located on top of bin 263.

Container 283′ has a screw conveyor 284 connecting the casing with a kiln feed pipe 285 leading to the material inlet of a kiln 287. As described in Patent No. 2,509,984, a constant head of material is maintained in container 283′, through which screw conveyor 284 is supplied, and screw conveyor 284 serves as a volumetric feeding means from the kiln feed bin to a conventional kiln 287.

Gases exhausted from the kiln 287 by draft fan 291 are cooled by spray nozzle 288 within chamber 286 if necessary. A cyclone 289 separates the larger dust particles from the exhaust gases and the fan 291 forces the gases through a series of dust collectors 292.

Screw conveyors 293 and 295 convey the collected dust to an elevator 297 which in turn conveys the dust to a bin 298. Feeder 299 regulates the discharge of the returned dust to an elevator 301 which returns the material to screw conveyor 284 for re-entry into the kiln 287. Similarly, any dust settling in chamber 286 is conveyed to elevator 297 and bin 298 for return to screw conveyor 284.

Bin 298 acts as a reservoir and enables the introduction of controlled amounts of the returned dust to the kiln along with other feed coming from the kiln feed bin.

Conveyor 303′, elevator 304′, and storage bin 305′ provide means for conveying and storing the dust from collectors 292 should a portion or all of the dust have a high alkaline content or otherwise be unsuitable for using as raw feed to the kiln.

While the kiln feed bin, constant head feeder and kiln in themselves are well known, applicants' novel arrangement of the alleviators, distribution boxes and conveying lines provides a versatile and improved system for the processing and feeding of the raw materials to the kilns.

Pump 227, which receives material from either of the blending silos, or from any of the kiln feed storage silos, pumps the material to alleviator 246 or to any of the kiln feed storage silos 207–210. Through aerated distribution box 265, the material discharged from alleviator 246 can be diverted to either or both of kiln feed bins 263 and 264 and their respective kilns.

Pump 228, which receives material from either of the blending silos, or from kiln feed storage, pumps the material to alleviator 246′ or to any of kiln feed storage silos 207 to 210. Through aerated distribution box 271, the material discharged from alleviator 246′ is diverted directly to kiln feed bin 264, or to aerated distribution box 265 from which the material is distributed to either or both of kiln feed bins 263 and 264.

As is apparent, this arrangement provides numerous possible modes of operation. For example, a special mix may be discharged from kiln feed storage and conveyed through pump 228, alleviator 246', aerated distribution box 271 to kiln feed bin 264, while a regular mix is simultaneously being discharged from one of the blending silos and conveyed by means of pump 227, alleviator 246 and aerated distribution box 265 to kiln feed bin 263. Hence, the kilns can be burning different types of cement raw material simultaneously.

In addition, the arrangement of the alleviators, distribution boxes and conveying lines provides means for feeding to both kilns even though one of the pumps is inoperative, due to needed repairs or maintenance, since pump 227 and 228 can individually feed to either or both of kiln feed bins 263 and 264. For example, should pump 227 be down, pump 228 pumps material to alleviator 246' and aerated distribution box 271 from where the material can be diverted to aerated distribution box 265 to either or both of kiln feed bins 263 and 264, or material can be diverted directly from aerated distribution box 271 to kiln feed bin 264, or diverted from aerated distribution box 271 to kiln feed bin 264 and aerated distribution box 265.

FIGS. 16–18 illustrate a modified blending arrangement and modified feeding mechanism for conveying material from the blending silos to the kiln feed bins and kiln feed storage. The modified blending mechanism is particularly adapted for continuous withdrawal of material from the blending silos.

As shown in FIG. 17 and FIG. 18, alleviator 299, mixer 303, weigh belt 302, and fluidized gravity conveying sections 236', 316' and 317' are similar to the corresponding elements shown in the previous blending system. Material pumped to alleviator 299 from the component silos is discharged and passes through mixer 303, onto weighing device 302, and through a junction box to either of silos 305 and 306 through conveying sections 316' or 317', respectively. The junction box contains a flap valve (not shown) which diverts material into either of conveying sections 316' or 317' to the respective blending silos.

Blending silos 305 and 306 are similar to the aforementioned silos 206 and 206 except that the modified silos 305 and 306 contain overflow spouts 307 and 308, respectively, connecting discharge outlets in the upper portions of the silos with a bucket elevator 310. The upper end of elevator 310 extends above a pair of fluidized gravity conveying sections or distribution boxes 315 and 316.

A diverter 311 has an upper end connected to the discharge of elevator 310 and two diverging leg portions 313 and 314 connected to fluidized gravity conveying sections 315 and 316, respectively. Elevator 310 conveys material into the upper end of diverter 311 and the material is diverted by a flap valve (not shown) through leg 313 to conveying section 315, or through leg 314 to conveying section 316.

Fluidized gravity conveying sections 315 and 316 extend above the kiln feed storage silos and kiln feed bins for feeding material thereto. Fluidized gravity conveying section 315 has side discharge boxes 323, 324, 325 and 326 connecting conveying section 315 with kiln feed storage silos 319, 321 adn kiln feed bins 329 and 330, respectively. Side discharge boxes 323–325 have flap valves 323–325', respectively, which may be positioned to divert material from conveying section 315 to the respective silos or bins. Material from the elevator 310 passing beyond discharge box 325 in conveying section 315 will be fed through discharge box 326 to kiln feed bin 330.

Similarly, fluidized gravity conveying section 316 has side discharge boxes 331, 332, 333 and 334 connecting conveying sections 316 to kiln feed storage silos 320, 322 and kiln feed bins 329 and 330, respectively. Discharge boxes 331, 332 and 333 contain flap valves 331'–333', respectively, which may be positioned to divert material to the respective silos or bins. Material in conveying section 316 which passes beyond discharge box 333 will be diverted into kiln feed bin 330. Material pumped from the component silos is fed to either silo 305 and 306 with the incoming material being continuously weighed by scale 302, and a substantially continuous representative sample being drawn off by sampler 300 and analyzed by control analyzer 301 as in the blending system shown in FIGS. 6–8.

During normal operation, at least one of the blending silos will be filled and material entering the full silo from weigh belt will force a like quantity of material through the overflow spout to elevator 310. The material will be discharged into the diverter 311 and diverted to one of the fluidized gravity conveying sections 315 or 316. Material will flow along one of the conveying sections until diverted through the proper side discharge box into the corresponding kiln feed storage silo or kiln feed bin as determined by the positions of the flap valves in the particular conveying section 315 or 316.

The overflow blending silo is particularly adapted for continuous blending in the proposed system. Operating by overflow withdrawal necessarily results in a substantially constant volume of material in the blending silo. At all times during normal operation the material level in the blending silo is known and discharge is equal to the feed rate into a blending silo. When working with known flow rates, and with a known volume and known level of material in the blending silo, reliable "flow equations" can be determined and programed into the computer. Moreover, with a constant volume, and constant material level in the blending silo, a minimum number of flow equations are necessary.

Were the material level in a blending silo fluctuating, a greater number of flow equations would be necessary. In addition, with a fluctuating volume, problems arise as to which equation is applicable at a given time due to the difficulty of determining the material level.

Depending on the volume of level of material in the blending silo as well as the flow rates of a given installation, the applicable flow equations are programed into the computer and the computer will adjust the feeder settings at given time intervals. The computer receives a substantially continuous analysis of the composition and amount of material fed to the blending silo by the control analyzer and scale. Based upon the information provided by the analyzer and scale, in conjunction with the applicable "flow equation," the computer will adjust the feeders at given intervals to correct the composition on the basis of material actually in the blending silo. The computer will know the amount and composition of material fed to the blending silo during each interval. It will know what percentages of the material fed during previous time intervals are still within the blending silos. By adding up these various weighted percentages, the computer at all times knows the amount and composition of the entire contents of the blending silo and can make corrections based on the entire contents of the blending silo. If desirable, a time lag can be built into the correction. For example, instead of basing the correction on the total volume, the computer can be programed to correct on the basis of 95% of the silo volume, that is, all but the first 5% in the blending silo when the feeder adjustment is made. However, since in the proposed system corrections are applied within minutes after the feeder adjustments are effected, and the blending silo has a retention time of several hours, generally the corrections can be based on the entire contents of the blending silo because only a small amount of the silo contents upon which the correction was based will have been discharged prior to applying the correction.

Hence, the volume blending silos of FIGS. 16–18 are particularly adapted to continuous blending since a constant volume of material can be automatically maintained and corrections may be based on a given volume of material in the silo, including material fed to the silo at a previous time interval wherein only a portion of such material is still within the silo. This enables more efficient use of the blending silos with a minimum amount of power expended and a minimum length of retention time in the silo.

When initially starting up the modified blending system, corrections will be made by the computer similarly as done in a batch process. That is, the computer will retain memory of the amount and composition of all material fed to the blending silo. Each adjustment of the feeders is based on the entire contents fed into the silo previous to any given correction.

When the blending silo is filled to the point of overflow the computer has memory of the contents of the silo. Additional incoming material results in a discharge of material through the overflow spout to elevator 310. Thereafter, all subsequent adjustments of the component silo modulating valves by the computer will be based upon the memory as modified by the proper programed "flow equation," as previously described.

Blending silos 305 and 306 are provided with discharge openings adjacent to the bottoms so that the silos may be emptied, for example, when it is necessary to shut down a blending silo for maintenance. When feed to a blending silo is stopped, the computer has memory of the composition and amount of the contents of the blending silo, and this material may be discharged through the bottom outlets to a constant level box 340 into a bucket elevator 342.

In addition, although particularly adapted to continuous blending, silos 305 and 306 can be used on a batch basis.

Constant level box 340 is similar to constant level box 232 following the blending silo 205 and 206 and serves as a pressure reducer and provides for controlled discharge into the elevator 342. Elevator 342 has an upper and overlying fluidized gravity conveying sections 315 and 316, and is connected thereto by a diverter 344 having an upper portion connected to the elevator and leg portions 345 and 346 connected to conveying sections 315 and 316, respectively. A flapper valve (not shown) diverts material from the upper portion of diverter 344 into one of the two leg portions and its corresponding conveying section wherein the material is diverted in the proper kiln feed storage silo or kiln feed bin.

Kiln feed storage silos 319–322 have discharge outlets connected to a fluidized gravity conveying section 350 by sections 351–354, respectively. The lower end of conveying section 350 is connected to elevator 342. Each of the kiln feed storage silos has an on-off valve 356 controlling discharge from the storage silos to the conveying sections leading to elevator 342. In addition, the kiln feed storage silos 319–322 have flow control valves (not shown) located in conveying sections 351–354, respectively.

The blending system illustrated in FIGS. 16–18 provides for a flexible and versatile operation wherein two different cement mixes can be fed to the respective kilns simultaneously. For example, overflow blending in one of the silos 305 or 306 will feed material to elevator 310 from where it is discharged into hopper 311 and directed to one of the fluidized gravity conveying sections 315 and 316 to one of kiln feed bins 329 or 330. At the same time, material may be discharged from one of the kiln feed storage silos to elevator 342 from where the material is discharged into diverter 344 and diverted to the other of fluidized gravity conveying sections 315 or 316 to the other of kiln feed bins 329 or 330. Conveying sections 315 and 316 serve a similar purpose as do distribution boxes 265 and 271 (FIG. 15) in supplying material to the kiln feed bins. In place of elevator 310, the blending silos may be elevated so that overflowing material could flow directly into diverter 314 to one of the conveying systems 315 or 316. Similarly, fluidizing pump and alleviator could be used in place of elevator 342.

The present invention incorporates primary and secondary crushers 1 and 8 similar to those used in present-day plants. The material in the quarry is analyzed beforehand, for example, by analysis of core drillings, and preferably a single kind of material is quarried at a given time. For example, high lime material may be quarried during one shift and another kind of material might be quarried on a subsequent shift. The material passing from the primary and secondary crushing system is stored in rock storage means, namely, silos 31–38, with each silo containing a particular kind of quarried material.

Preferably a single kind of material is discharged from the rock storage silos 31–38 at a time, with the material fed through a grinding mechanism or ball mill 70, and conveyed to component silos 80–89. Component silos 80–89, respectively, store material according to various predetermined classifications based on chemical composition.

A substantially continuous sample of the material fed to the component silos 80–89 is taken by sampler 78 and analyzed by sorting analyzer 79. Analyzer 79 is preset to measure the percentages of selected elements or components. For example, in the instant application, analyzer 79 is preset to determine the percentages of calcium, silicon, aluminum, and iron, and analyzer 79 simultaneously and continuously measures the percentage of each of these various components in the sampled material and feeds this information to computer 79'. The computer 79', in response to the analysis of the material by analyzer 79, controls a plurality of valves which regulate the distribution of material from distribution box 77 to the respective component silos 80–89.

Each component silo contains a type of material having a composition within a given chemical range. For example, material containing a given percentage of the calcium component is fed to high calcium silo 80. Similarly, the other silos, respectively, contain various types of materials having compositions within given chemical ranges. Depending upon the analysis of the material by sorting analyzer 79, computer 79' positions the valves so that the various types of materials fed to the component silos will be separately stored in the respective component silos.

Several advantages are achieved by discharging one kind of material from the rock storage silos 31–38 at a time, prior to grinding and conveying the material to the component silos 80–89. With material of a fairly uniform composition fed to the component silos, the computer 79' need open and close a minimum number of the valves which control the distribution of material from distribution box 77 to the component silos 80–89. In addition, by grinding material of more uniform composition, more efficient operation of the grinding mill 70 is effected. With a single kind of quarried material ground at one time, the material can be ground to the desired fineness readily and with optimum efficiency of the mill circuit. On the other hand, under present-day operation, the combining of the different raw materials is done prior to grinding. Since the various raw materials have different physical properties, it is difficult to have a finished raw product of uniform particle size. The soft materials tend to be ground too finely if the harder materials are ground to the desired size.

The number and ranges of the predetermined chemical classifications programed into the computer are dependent on the chemistry of the quarry. In the instant application, the material is sorted into one of six chemical classifications, generally referred to as high lime, medium lime, low lime, high silica, high iron and high alumina.

In some installations, possibly two ranges of calcium would suffice. Or it might be desirable to have two ranges of silica. And in some installations it may be preferable to have the sorting analyzer and computer automatically distribute different ranges of calcium ion, and have one or more of the other components distributed to the proper component silos by manual selection. This latter procedure would be particularly adapted to an installation where some of the materials are not prevalent in the quarry, but are provided from an outside source and introduced into the system through bin 21.

Material is discharged from the component silos under the control of computer 79' and fed to one of the blending silos 205 or 206, FIGS. 6–8, or 305 or 306, FIGS. 17 and 18. The material is discharged from the component silos in proportions to provide a blended material having a chemical composition within predetermined limits, that is, material discharged from the blending silos contains each of the preselected components within predetermined limits. The particular chemical limits depend on the type cement being produced.

The material discharged from the component silos is substantially continuously analyzed by analyzing means. Analyzing means comprises sampler 200, control analyzer 201, and scale 202. Sampler 200 takes a substantially continuous representative sample of the material fed to the blending silo, and the sample is continuously analyzed by control analyzer 201. Analyzer 201 measures the percentage of the various components, for example, calcium, silicon, aluminum and iron. Scale 200 continuously measures the quantity of material delivered to the blending silos. The signals from the control analyzer 201 and scale 202 inform the computer 79' of a weighted percentage of the various components fed to the blending silo.

The computer 79' accumulates and has memory of the quality-quantity information provided by the analyzing means, and at regular specified time intervals adjusts modulating valves 192 to make any necessary corrections in the composition of the previously discharged material to maintain the material within the predetermined chemical limits.

Should the composition of the material fed into the blending silo deviate outside a predetermined range, the computer will adjust vaves 192 to correct for such deviations, so that the blended material will continue to have each of the components within the predetermined limits. The corrections effected by the computer are based on the material actually within the blending silo as a result of programed flow equations in the computer.

While continuous blending is particularly desirable, the present invention is also adapted to a batch blending system.

In addition to computer 79' controlling the composition of the material discharged from the ground storage silos, the computer is responsive to signals received from a volume sensing device in constant level box 156 so that valves 192 are set to maintain a constant head of material ahead of feeding mechanism, namely pumps 187 and 188, used for conveying the material to one of the blending silos.

The material discharged from the blending silos is conveyed either directly to kiln feed bins in the kiln area, or to kiln feed storage. The blending and conveying systems shown in FIGS. 6–8 and in FIGS. 17, 18 are both well adapted for versatile operation. Two different kiln feed mixes can be fed to respective kiln feed bins simultaneously, one mix from blending and another from kiln feed storage.

While only two kiln feed bins and kilns are illustrated in each modification, it is apparent that additional kiln feed bins and kilns could be added if the capacity required it.

Similarly, while only a single ball mill circuit is illustrated, one or more additional ball mill circuits could be added in parallel to receive a proportionate amount of the discharge from the rock storage silos if the capacity required it. Or, if instead of a single separator in the ball mill circuit, it might be desirable to use two separators in parallel, each receiving a proportionate amount from the ball mill.

Similarly, the number of primary crushers, secondary crushers, and silos depends upon their individual capacities as well as the over-all capacity of the plant.

From the foregoing description it will be apparent that the present invention provides means whereby a quality-controlled product may be obtained, and the equipment may be more efficiently operated, and with reduced maintenance costs.

The particularly illustrated and described embodiments are merely illustrative, and are not to limit applicants' invention, the scope of which is covered in the following claims.

We claim:

1. Apparatus for the processing of raw material to be used in the production of Portland cement which comprises rock storage means for the separate storage of quarried cement-forming crushed materials respectively differing in chemical composition and ease of grinding and suitable as ingredients in the production of Portland cement, grinding mechanism for reducing crushed material discharged from said rock storage means to a size suitable for burning in a cement kiln, means for charging material from a selected one of the separately stored materials to said grinding mechanism, for separate grinding thereof, a plurality of ground material storage silos, conveyor means for conveying the ground material discharged from the grinding mechanism to said ground material storage silos, means for analyzing at least one chemical constituent of the ground material, sorting means for controlling the distribution of the ground material from said conveyor means to the respective ground material storage silos in accordance with the chemical composition of that material, said ground material storage silos having discharge openings, blending mechanism, conveyor means positioned to receive material discharged through said openings and to convey it to said blending mechanism, and proportioning means for so controlling the discharge of material through the discharge openings of said ground material storage silos onto said conveyor means to provide the blending mechanism with material having a composition within predetermined limits suitable for burning into cement clinker.

2. Apparatus as set forth in claim 1 wherein said proportioning means comprises analyzing means for sensing the composition of the material conveyed to the blending mechanism from the ground material storage silos, modulating means for regulating the discharge of material from said ground material storage silos, and a control means connected to said analyzing means for controlling the modulating means in response to the analysis of the material by the analyzing means to effect a combined discharge of materials from said storage silos having a composition within the predetermined limits.

3. Apparatus as set forth in claim 2 wherein the conveyor means connecting the grinding mechanism with the ground material storage silos comprises distributing means, said sorting means comprises a sorting analyzer which analyzes the material, and said control means is connected to and controls the distributing means in response to the sorting analyzer to distribute the material to the appropriate ground material storage silos.

4. Apparatus as set forth in claim 3 including a by-pass conveying means connecting the conveyor distributing means with the blending mechanism, and valve means for controlling flow through said by-pass conveying means.

5. Apparatus as set forth in claim 4 wherein the modulating means comprises valves controlled by the computer.

6. Apparatus as set forth in claim 1 wherein the analyzing means comprises a component-percentage analyzer for sensing and transmitting to said last mentioned electronic means the percentages of preselected components of the material and a quantity-sensing means for sensing and transmitting to said last mentioned electronic means the quantity of material conveyed from the respective silos to the blending mechanism, said transmitted information from said analyzer and said quantity-sensing means providing the said last mentioned electronic means with weighted percentages of the preselected components.

7. Apparatus for the processing of raw material used in the production of Portland cement comprising rock storage means for the separate storage of quarried crushed materials respectively differing in chemical and physical properties and suitable as ingredients in the production of Portland cement, grinding mechanism for reducing the crushed material discharged from the rock storage means to a size suitable for burning in a cement kiln, means for charging material from a selected one of the separately stored materials to said grinding mechanism, for separate grinding thereof, a plurality of ground material silos adapted to receive the ground material from the grinding mechanism, sorting conveying means for conveying and distributing material from the grinding mechanism to the appropriate component silos, a sorting analyzer between said grinding mechanism and said component silos for analyzing the material conveyed from the grinding mechanism to said ground material silos, electronic means connected to said sorting analyzer to receive from the sorting analyzer the analysis of the ground material, said sorting conveying means comprising ground material silos distributing means connected to and controlled by the electronic means to distribute material from the grinding mechanism to the ground material silos in accordance with the chemical composition of such material so that the ground material silos respectively receive different classifications of material, each classification having a composition within a close chemical range, said ground material silos having discharge openings, blending mechanism for blending materials, conveyor means connecting the discharge openings of the ground material silos with said blending mechanisms, proportioning means for controlling the discharge of material from the respective ground material silo discharge openings to provide the blending mechanism with material having a composition within predetermined limits suitable for burning into cement clinker, said proportioning means comprising analyzing means for sensing the composition of the material conveyed to the blending mechanism from the ground material silos, electronic means connected to and receiving information from the analyzing means and modulating means for regulating the discharge of material from the ground material silos, said modulating means being connected to and controlled by said last mentioned electronic means in response to the analysis by said analyzing means, first and second pumping means for entraining pulverulent material in a stream of gas, conveying sections connecting said blending mechanism with said first and second pumping means, valve means controlling discharge of material from said blending mechanism to said first and second pumping means, first and second alleviators connected, respectively, to said first and second pumping means for receiving material therefrom and for separating gas and material received therein, kiln feed storage means having inlet and outlet means, conveying sections connecting said kiln feed storage outlet means with said first and second pumping means, valve means controlling discharge from said kiln feed storage means to said first and second pumping means, first conduit means connecting said first pumping means with said first alleviator and with the inlet means of said kiln feed storage means, valve means controlling flow in said first conduit means selectively to divert material received from said first pumping means to said first alleviator and to said kiln feed storage means, second conduit means connecting said second pumping means with said second alleviator and with the inlet means of said kiln feed storage means, valve means controlling flow through said second conduit means selectively to divert material received from said second pumping means to said second alleviator and to said kiln feed storage means, first distributing means receiving material discharged from said first alleviator, second dstributing means receiving material from said second alleviator, a conveying section connecting said first and second distributing means for the movement of material from one of said first and second distributing means to the other of said first and second distributing means, a plurality of kiln feed bins, conveying sections connecting the kiln feed bins with said first distributing means, and a conveying section connecting at least one of said kiln feed bins with said second distributing means.

8. Apparatus as set forth in claim 7 having by-pass conveying means connecting said ground material silo distributing means with said blending mechanism.

9. Apparatus as set forth in claim 8 wherein the conveying means connecting the ground material silos to the blending mechanism includes a bin receiving the material discharged from the ground material silos and feeder mechanism for feeding material from said bin to said blending mechanism, and said means for controlling the discharge of material from the respective silos includes level-sensing means for sensing the level of material in the bin, said second-mentioned electronic means being connected to said level-sensing means to receive information therefrom, said second-mentioned electronic means, in response to information provided by the analyzing means and the level-sensing means, controlling the modulating means to effect a combined discharge having a composition within predetermined limits and in such amounts as to provide a constant head of material in the bin ahead of said feeder mechanism.

10. A method for the preparation of Portland cement raw feed from cement-forming raw materials having variations in chemical composition and ease of grinding comprising separately grinding materials having such differing properties each to a particle size suitable for burning in a kiln, analyzing each of the ground materials regarding at least one chemical constituent thereof, sorting the analyzed material according to predetermined classifications based upon chemical composition, and selecting and combining material from said classifications in such relative proportions as to give a feed material having a preselected composition.

11. The method of claim 10 including the step of separating at least one of the ground materials into fractions according to its analyzed chemical composition, and other of said materials are thereafter combined with a selected fraction of said separated material.

12. A method according to claim 10 including substantially continuously analyzing material combined from said classifications to determine any deviation in the composition of the combined material outside a predetermined range, and upon the determination of any such deviation in the composition of the combined material outside said predetermined range, adjusting the relative proportions in which materials from the respective classifications are combined to correct for such deviations.

13. The method of claim 10 including the step of separating at least one of said kinds of materials into fractions according to its chemical composition, combining other of said materials with a selected fraction of said one kind of material to give a resulting mixture having the several components of the feed material within predetermined limits.

(References on following page)

References Cited by the Examiner

UNITED STATES PATENTS

| | | | |
|---|---|---|---|
| 1,811,233 | 6/1931 | Harrison. | |
| 1,893,522 | 1/1933 | Oliver et al. | 106—100 |
| 1,916,417 | 7/1933 | Coulson | 106—103 |
| 2,015,488 | 9/1935 | Manabe | 106—100 |
| 2,144,254 | 1/1939 | Breerwood | 106—100 |
| 2,431,058 | 11/1947 | Manning | 222—52 |
| 2,534,656 | 12/1950 | Bond | 23—253 X |
| 2,805,898 | 9/1957 | Willis | 302—29 |
| 2,883,240 | 4/1959 | Hahl et al. | 302—29 |

OTHER REFERENCES

Grabbe: Automation in Business and Industry, pages 432–4 (1957). J. Wiley and Sons, Inc., N.Y.

Lea et al.: Chemistry of Cement and Concrete, pages 25–27 (1956).

Pitt and Quarry, Utley, vol. 52 No. 8, February, 1960, pages 90–95.

Rock Products, "Computer Masterminds Raw Materials Blending" (Torgerson), vol. 62, July–December 1959 (pages 116–123 of September relied on).

MORRIS O. WOLK, *Primary Examiner.*

JOSEPH REBOLD, *Examiner.*